United States Patent
Shimo et al.

(10) Patent No.: US 12,499,621 B2
(45) Date of Patent: Dec. 16, 2025

(54) THREE-DIMENSIONAL SHAPE DATA GENERATION METHOD AND INFORMATION PROCESSING APPARATUS

(71) Applicants: Fujitsu Limited, Kawasaki (JP); Japan Medical Device Corporation, Kawasaki (JP); UT-Heart Inc., Tokyo (JP)

(72) Inventors: Jinse Shimo, Kawasaki (JP); Kazuo Minami, Kawasaki (JP); Shuichi Chiba, Kawasaki (JP); Yoshihiko Tokumaru, Kawasaki (JP); Takafumi Okano, Kawasaki (JP); Seiryo Sugiura, Setagaya (JP); Jun-ichi Okada, Setagaya (JP); Toshiaki Hisada, Setagaya (JP); Takumi Washio, Setagaya (JP); Masahiro Watanabe, Kawasaki (JP); Yasutomo Shimizu, Sumida (JP)

(73) Assignees: Fujitsu Limited, Kawasaki (JP); Japan Medical Device Corporation, Kawasaki (JP); UT-Heart Inc., Tokyo (JP)

( * ) Notice: Subject to any disclaimer, the term of this patent is extended or adjusted under 35 U.S.C. 154(b) by 121 days.

(21) Appl. No.: 18/212,222

(22) Filed: Jun. 21, 2023

(65) Prior Publication Data

US 2024/0005603 A1  Jan. 4, 2024

(30) Foreign Application Priority Data

Jun. 30, 2022 (JP) .................................. 2022-106014

(51) Int. Cl.
*G06T 7/50* (2017.01)
*G06T 7/13* (2017.01)
(Continued)

(52) U.S. Cl.
CPC ................ *G06T 17/10* (2013.01); *G06T 7/13* (2017.01); *G06T 7/50* (2017.01); *G06T 7/70* (2017.01);
(Continued)

(58) Field of Classification Search
CPC . G06T 7/70; G06T 19/20; G06T 2207/10116; G06T 2219/2016
(Continued)

(56) References Cited

U.S. PATENT DOCUMENTS 10,575,823 B2   3/2020 Okazaki et al.
2016/0007852 A1* 1/2016 Warner .................. A61B 6/487
                                                            600/374
(Continued)

FOREIGN PATENT DOCUMENTS

JP    2005-528974 A   9/2005
JP    2006-110069 A   4/2006
(Continued)

OTHER PUBLICATIONS

Osawa, English Translation of JP-2006181146-A, 2006 (Year: 2006).*
(Continued)

*Primary Examiner* — Samantha (Yuehan) Wang
(74) *Attorney, Agent, or Firm* — WHDA, LLP

(57) ABSTRACT

An information processing apparatus generates heart shape data indicating a three-dimensional shape including an internal structure of a heart of a subject based on echo image data indicating a cross-sectional image of the heart. The information processing apparatus then generates thorax shape data indicating a three-dimensional shape of a thorax of the subject based on X-ray image data indicating an X-ray image of the thorax of the subject. The information processing apparatus then decides, based on an image of the heart appearing in the X-ray image, a position and an orientation
(Continued)

of the three-dimensional shape of the heart indicated by the heart shape data within the three-dimensional shape of the thorax indicated by the thorax shape data.

8 Claims, 31 Drawing Sheets

(51) Int. Cl.
 *G06T 7/70* (2017.01)
 *G06T 17/10* (2006.01)
 *G06T 19/20* (2011.01)

(52) U.S. Cl.
 CPC .... *G06T 19/20* (2013.01); *G06T 2207/10116* (2013.01); *G06T 2207/10132* (2013.01); *G06T 2207/30048* (2013.01); *G06T 2210/41* (2013.01); *G06T 2219/2016* (2013.01)

(58) Field of Classification Search
 USPC ......................................................... 345/420
 See application file for complete search history.

(56) References Cited

U.S. PATENT DOCUMENTS

| | | | |
|---|---|---|---|
| 2017/0032095 A1 | 2/2017 | Kadooka | |
| 2018/0042573 A1* | 2/2018 | Fukuda | A61B 8/463 |
| 2020/0105070 A1* | 4/2020 | Coustaud | G06T 11/60 |
| 2021/0217232 A1 | 7/2021 | Lupotti et al. | |

FOREIGN PATENT DOCUMENTS

| | | | |
|---|---|---|---|
| JP | 2006181146 A | * | 7/2006 |
| JP | 2017-033227 A | | 2/2017 |
| JP | 2018-027298 A | | 2/2018 |
| JP | 2021-083961 A | | 6/2021 |

OTHER PUBLICATIONS

Thaijiam, How to Make an Easy Human Thorax Model, The 2011 Biomedical Engineering International Conference (BMEiCON-2011), pp. 182-185 (Year: 2011).*
Office Action dated Mar. 5, 2023, issued in counterpart JP application No. 2022-106014, with English translation. (8 pages).
Office Action dated Mar. 5, 2024, issued in counterpart JP application No. 2022-106014, with English translation. (8 pages).
Extended European Search Report dated Jan. 12, 2023, issued in counterpart EP application No. 23180272.9. (8 pages).
Fournier et al., "Cardiac tomography-echocardiography imaging fusion: a new approach to congenital heart disease", Revista Espanola de Cardiologia, 2023, vol. 76, No. 1. pp. 10-18, cited in EP Extended European Search Report dated Jan. 12, 2023. (8 pages).
Extended European Search Report dated Dec. 1, 2023, issued in counterpart EP application No. 23180272.9. (8 pages).
Fournier et al., "Cardiac tomography-echocardiography imaging fusion: a new approach to congenital heart disease", Revista Espanola de Cardiologia, 2023, vol. 76, No. 1. pp. 10-18, cited in EP Extended European Search Report dated Dec. 1, 2023. (8 pages).
1 Office Action dated May 1, 2025, issued in counterpart Indian Application No. 202334041761. (8 pages).
Office Action dated Aug. 20, 2025, issued in counterpart KR Application No. 10-2023-0080798, with English translation. (16 pages).

* cited by examiner

30 ECHO IMAGE
31
32

DESIGNATE PREDETERMINED BOUNDARIES

33 HEART MODEL

SEGMENTATION

141
HEART SHAPE DATA
(POLYGON DATA)

SET LANDMARKS ON ANTERIOR INTERVENTRICULAR SULCUS
AND POSTERIOR INTERVENTRICULAR SULCUS

SET LANDMARKS SUCH AS CARDIAC APEX
AND MITRAL VALVE CENTER

SEGMENTATION (IN TWO DIRECTIONS)

CALCULATE BOUNDARY POINT GROUP

THORAX SHAPE DATA — 151

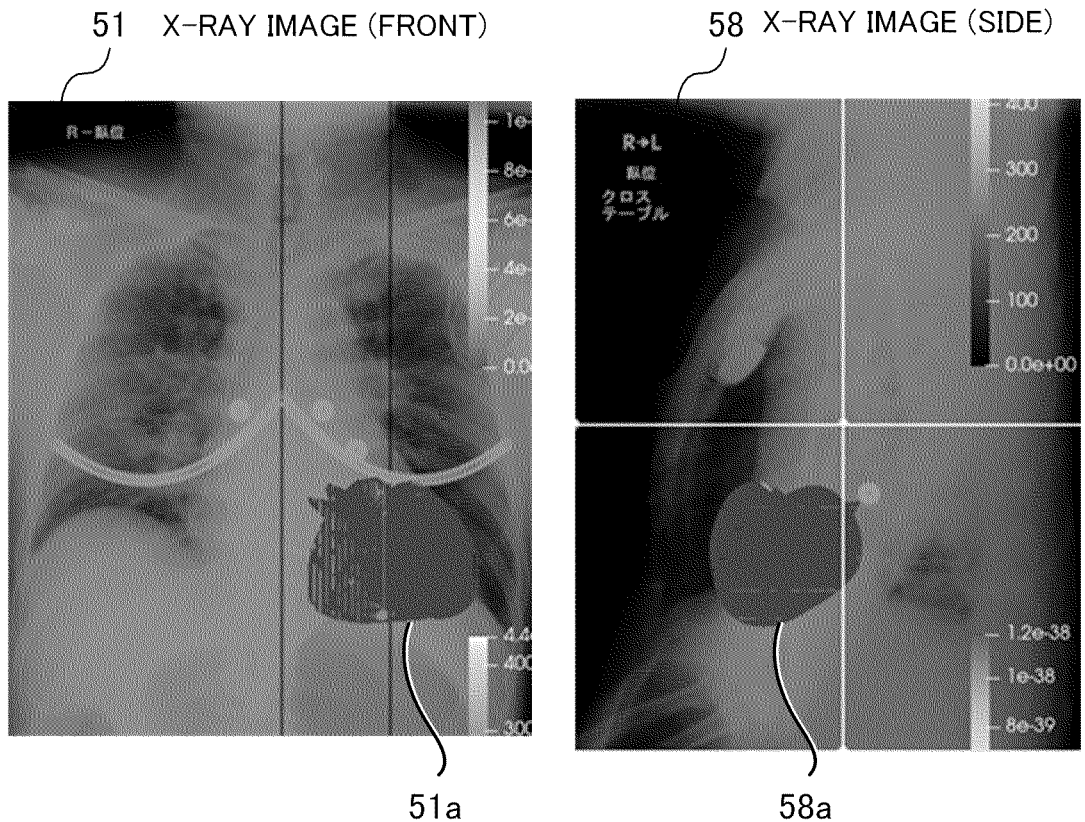
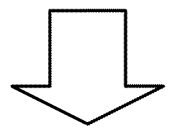
FIG. 28
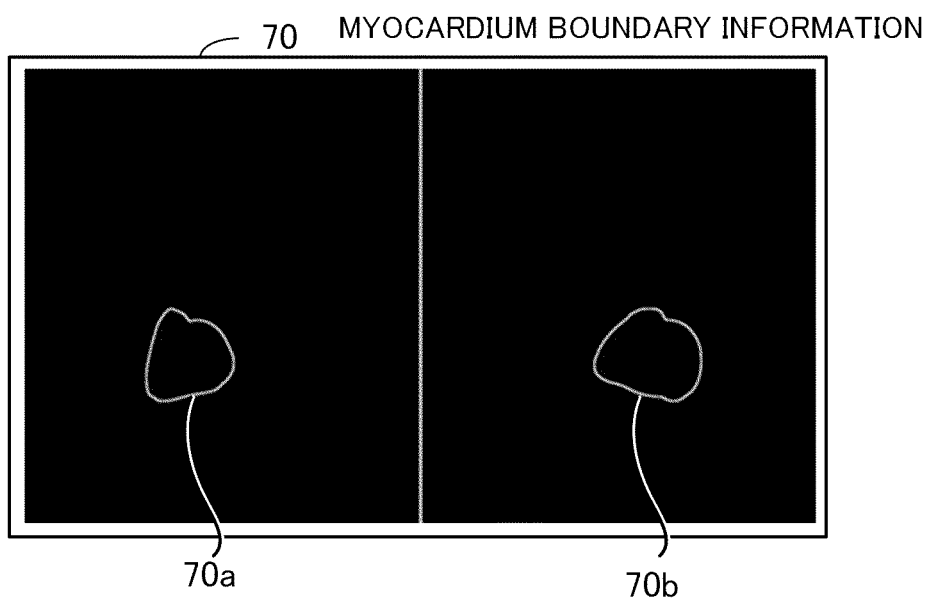

THREE-DIMENSIONAL SHAPE DATA GENERATION METHOD AND INFORMATION PROCESSING APPARATUS

CROSS-REFERENCE TO RELATED APPLICATION

This application is based upon and claims the benefit of priority of the prior Japanese Patent Application No. 2022-106014, filed on Jun. 30, 2022, the entire contents of which are incorporated herein by reference.

FIELD

The embodiments discussed herein relate to a three-dimensional shape data generation method and an information processing apparatus.

BACKGROUND

Heart simulation technologies that reproduce the motion of the heart of a subject, such as a human patient, with high accuracy using a computer have been realized. By using such heart simulation technologies, it is possible in the field of medicine to predict therapeutic effects of treatment by reproducing the state of the patient's heart after the treatment through a heart simulation.

By performing a biological simulation to reproduce not only the heart but also the propagation of electrical signals inside the thorax, it is also possible to acquire electrocardiograms for the patient through the biological simulation. For a disease where the patient's symptoms appear on an electrocardiogram, performing a biological simulation to calculate an electrocardiogram indicating the post-treatment state makes it possible to determine in advance whether the planned treatment is appropriate. As one example, when administering cardiac resynchronization therapy (CRT) through biventricular pacing, performing a biological simulation in advance makes it possible to confirm whether the positions of the electrodes that apply the electrical stimulation outputted to the heart from a CRT apparatus are appropriate.

Note that an electrocardiogram represents electrical signals that have propagated to the chest surface. For this reason, in a biological simulation for calculating an electrocardiogram, three-dimensional shape data indicating a three-dimensional shape where the heart has been disposed inside the thorax is used. As one example, this three-dimensional shape data is generated based on medical image data obtained by imaging of the patient's heart or thorax.

As one example of a technology that uses medical image data, a medical processing apparatus that displays an overview of analysis results of structures in the heart has been proposed. An image processing apparatus that is able to simply and accurately detect the thorax has also been proposed. In addition, a medical image processing apparatus capable of highly accurate alignment of a plurality of medical image data produced by imaging of subjects in different postures has also been proposed.

As a technology for judging the effects of treatment by way of computer simulation, a biological simulation system with an improvement rate determination unit that determines whether the result of biological simulation satisfies a predetermined improvement rate for symptoms has been proposed.

See, for example, Japanese Laid-open Patent Publication No. 2018-027298, Japanese Laid-open Patent Publication No. 2006-110069, Japanese Laid-open Patent Publication No. 2021-083961, and Japanese Laid-open Patent Publication No. 2017-033227.

SUMMARY

According to an aspect of the present disclosure, there is provided a non-transitory computer-readable recording medium storing therein a computer program that causes a computer to execute a process including: generating heart shape data indicating a three-dimensional shape including an internal structure of a heart of a subject based on echo image data indicating a cross-sectional image of the heart; generating thorax shape data indicating a three-dimensional shape of a thorax of the subject based on X-ray image data indicating an X-ray image of the thorax of the subject; and deciding, based on an image of the heart appearing in the X-ray image, a position and an orientation of the three-dimensional shape of the heart indicated by the heart shape data within the three-dimensional shape of the thorax indicated by the thorax shape data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. depicts one example of a three-dimensional shape data generation method according to a first embodiment;

FIG. 28 depicts an example of a myocardium boundary information generation process;

DESCRIPTION OF EMBODIMENTS

When calculating an electrocardiogram during biological simulation, there is demand for the generation of three-dimensional shape data that accurately reproduces the thorax of the subject and the heart inside the thorax. Three-dimensional shape data of the subject may be generated based on medical images of the subject. As one example, in tomographic images (or computed tomography (CT) images) of a subject produced by a CT apparatus, the thorax and heart of the subject will appear in the same image. This means that by using CT images, it is possible to generate accurate three-dimensional shape data that reproduces the thorax of the subject and the heart inside the thorax.

However, imaging with a CT apparatus exposes the subject to a large amount of radiation and places a heavy physical burden on the patient who is the subject. It is therefore desirable to avoid imaging with a CT apparatus simply for the purpose of biological simulation. It would be conceivable to generate three-dimensional shape data of a subject based on non-CT medical images which are in general use during the course of treatment. As examples, it would be conceivable to generate three-dimensional shape data from cardiac images (echo images) obtained by an ultrasonic diagnostic apparatus and X-ray images taken by an X-ray apparatus. Ultrasound is used for echo imaging, meaning that the subject is not exposed to radiation. X-ray imaging exposes the subject to a much smaller dose of radiation than imaging with a CT apparatus. However, there is no existing technique for generating three-dimensional shape data that reproduces the thorax and the heart inside the thorax based on echo images depicting only the heart and X-ray images that only indicate two-dimensional shapes.

Several embodiments will be described below with reference to the accompanying drawings. Note that the respective embodiments may be implemented in combination with other embodiments within a range that is technically consistent.

First Embodiment

The first embodiment is a three-dimensional shape data generation method capable of generating three-dimensional shape data indicating a three-dimensional shape which reflects the physical characteristics of a subject with high precision.

Figure 1:
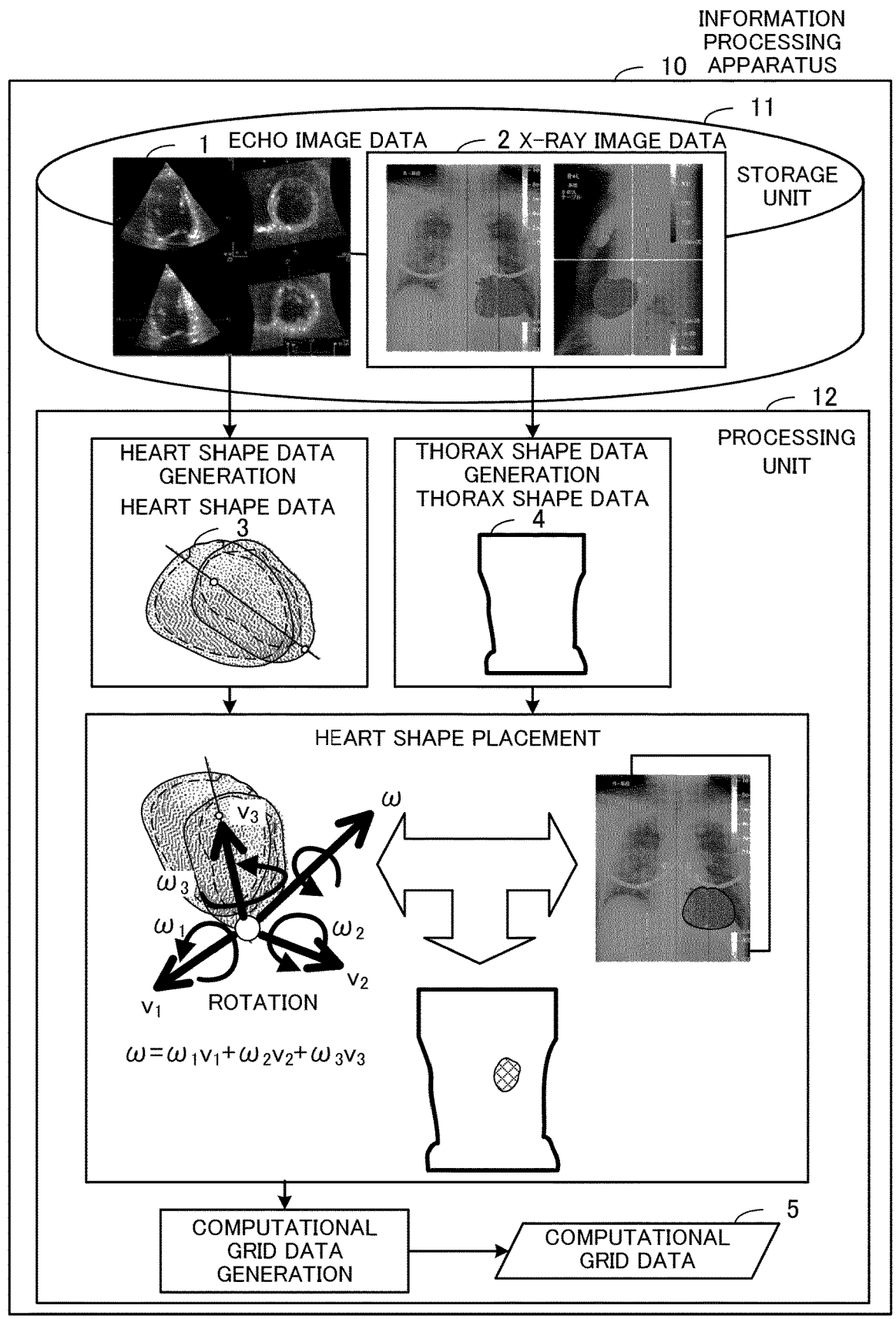

FIG. depicts one example of a three-dimensional shape data generation method according to the first embodiment. FIG. 1 depicts an information processing apparatus 10 that implements this three-dimensional shape data generation method. The information processing apparatus 10 implements this three-dimensional shape data generation method by executing a three-dimensional shape data generation program, for example.

The information processing apparatus 10 includes a storage unit 11 and a processing unit 12. The storage unit 11 is a memory or a storage apparatus included in the information processing apparatus 10, for example. As one example, the processing unit 12 is a processor or a computational circuit included in the information processing apparatus 10.

The storage unit 11 stores echo image data 1 and X-ray image data 2. The echo image data 1 is data indicating cross-sectional images (echo images) of the heart obtained by measuring the heart of the subject using an ultrasonic diagnostic apparatus. The echo image data 1 includes, for example, echo images of cross sections obtained by slicing the heart of the subject in the vertical plane and the horizontal plane. The X-ray image data 2 is data indicating X-ray images obtained by performing X-ray imaging of the subject's thorax using an X-ray examination apparatus. As examples, the X-ray image data 2 includes an X-ray image from when the subject is X-rayed from the front and an X-ray image from when the subject is X-rayed from the side.

The processing unit 12 generates three-dimensional shape data of the subject's heart and thorax based on the echo image data 1 and the X-ray image data 2. As one example, the processing unit 12 generates heart shape data 3 indicating a three-dimensional shape including the internal structure of the heart based on the echo image data 1 indicating cross-sectional images of the subject's heart. The processing unit 12 also generates thorax shape data 4 indicating the three-dimensional shape of the subject's thorax based on the X-ray image data 2 of the subject's thorax. The processing unit 12 then decides, based on the heart images indicated in the X-ray image data 2, the position and orientation of the three-dimensional shape of the heart indicated by the heart shape data 3 within the three-dimensional shape of the thorax indicated by the thorax shape data 4.

As described above, according to this three-dimensional shape data generation method, the heart shape data 3 is generated from the echo image data 1 and the thorax shape data 4 is generated from the X-ray image data 2. Although the heart shape data 3 and the thorax shape data 4 are separately generated from different data, the position of the three-dimensional shape of the heart indicated by the heart shape data 3 within the three-dimensional shape of the thorax is decided based on the X-ray image data 2 used to generate the thorax shape data 4. This makes it possible to accurately specify the position of the three-dimensional shape of the heart within the three-dimensional shape of the thorax.

Although the position of the heart may be determined from the X-ray image data 2, the internal structure of the heart are not apprehensible from the X-ray image data 2. By using the echo image data 1 to generate the heart shape data 3, it is possible to generate the heart shape data 3 that indicates the shape of the heart, including the internal structures of the heart. As a result, it is possible to generate highly accurate three-dimensional shape data including the three-dimensional shape of the thorax and the three-dimensional shape of the heart (including internal structures) within the thorax.

Note that although a CT apparatus is available as one example of an apparatus capable of image pickup of internal structures of the heart, imaging with a CT apparatus exposes the subject to a large dose of radiation. On the other hand, the echo image data 1 may be acquired using an ultrasonic diagnostic apparatus. An ultrasonic diagnostic apparatus generates images of internal organs by receiving ultrasonic waves that have been reflected inside the body of the subject. Since an ultrasonic diagnostic apparatus does not use radiation, the physical burden placed on the subject when acquiring the echo image data 1 may be reduced.

Moreover, ultrasonic diagnostic apparatuses and X-ray examination apparatuses are already installed at many medical institutions and are in common use for examining patients with heart disease. By making it possible to generate three-dimensional shape data indicating the patient's physical characteristics from the echo image data 1 and the X-ray image data 2, the three-dimensional shape data indicating the patient's physical characteristics is generated without performing any examinations separately to those performed during normal medical practice. This makes medical practice more efficient and reduces the burden placed on patients.

The three-dimensional shape of the heart appearing in the heart shape data 3 includes, for example, the three-dimensional shape of a ventricular lumen, the three-dimensional shape of the ventricular epicardium, and the three-dimensional shape of the epicardium covering the two ventricles. When generating such three-dimensional shapes, the processing unit 12 specifies, from a plurality of cross-sectional images of the heart that have been taken from a plurality of directions and are included in the echo image data 1, closed curves indicating a ventricular lumen, closed curves indicating the ventricular epicardium, and a closed curve indicating the epicardium covering the two ventricles. The processing unit 12 then generates the three-dimensional shape of the ventricular lumen, the three-dimensional shape of the ventricular epicardium, and the three-dimensional shape of the epicardium covering the two ventricles based on the closed curves specified by the plurality of cross-sectional images.

Note that the shape of the ventricular lumen specified from the cross-sectional images of the heart indicated in the echo image data 1 may be one of the two ventricles. As one example, when the three-dimensional shape of the left ventricular lumen has been specified, the region between the lumen and the ventricular epicardium of the left ventricle (hereinafter referred to as the "left ventricular epicardium") is the myocardial region of the left ventricle. A region obtained by excluding the region of the left ventricle (that is, the myocardial region and the lumen) from the three-dimensional shape of the epicardium covering the two ventricles is the region of the right ventricle. The three-dimensional shape of an internal region with the thickness of the myocardium starting from, the epicardium in the region of the right ventricle corresponds to the right ventricular endocardium, and the inside of this is the right ventricular lumen. The region of the myocardium between the left and right ventricles is the septum.

The shape of a ventricular lumen, the shape of the ventricular epicardium, and the shape of the epicardium covering the two ventricles are specified from a plurality of cross-sectional images of the heart based on an input from the user specifying such shapes, for example. The processing unit 12 may use an image segmentation technique, which uses technologies such as machine learning, to specify the shape of the ventricular lumen, the shape of the ventricular epicardium, and the shape of the epicardium covering the two ventricles.

When the echo image data 1 has been acquired using an ultrasonic diagnostic apparatus, an examination report describing the characteristics of the subject's heart may be issued. This examination report includes myocardium thickness information indicating the thickness of the myocardium, for example. For this reason, it is possible for the processing unit 12 to extract the myocardium thickness information from an examination report describing the characteristics of the heart and generate the heart shape data 3 in which the thickness of the myocardium in the three-dimensional shape of the heart is corrected based on the myocardium thickness information. By doing so, the accuracy of the three-dimensional shape of the heart indicated by the heart shape data 3 is improved.

When the thorax shape data 4 is generated, the three-dimensional shape of the thorax of the subject may be specified using a statistically obtained average thorax shape. In this case, the processing unit 12 extracts the outer edge of the thorax based on X-ray images of the thorax indicated in the X-ray image data 2 and generates the three-dimensional shape of the thorax based on the extracted outer edge and the statistically obtained average thorax shape. As one example, the processing unit 12 decides the parameters of a function that obtains the position of the outer edge of a cross section of the thorax based on the width of the thorax which is in turn based on the average shape of the thorax. Additionally, the processing unit 12 calculates, using the function to which the generated parameters have been applied, a width at each height of the thorax from the outer edge of the thorax obtained based on the X-ray image. The processing unit 12 then calculates the shape of the outer edge of a cross section of the thorax at each height by substituting the value of the width of the thorax rc at each height into the function. By doing so, a three-dimensional shape of a thorax which reflects the characteristics of the actual thorax of the subject is obtained.

The processing unit 12 is also able to generate a highly accurate thorax shape model using an X-ray image from the front and an X-ray image from the side. As one example, the processing unit 12 generates similar thorax shapes by enlarging or reducing the average thorax shape based on the outer edge of the thorax that appears in an X-ray image. Next, the processing unit 12 corrects the ratio between the horizontal width and the vertical width of the similar thorax shapes based on the ratio between the horizontal width of the thorax indicated in a first X-ray image taken from the front and the vertical width of the thorax indicated in a second X-ray image taken from the side. By doing so, a thorax shape that matches the body type of the subject is obtained.

Based on the X-ray image from the side, the processing unit 12 is capable of reproducing the curvature of the thorax when viewed from the side with high accuracy. As one example, the processing unit 12 specifies a centerline of the thorax when looking from the side based on the second X-ray image. Based on this center line, the processing unit 12 then determines the position in a three-dimensional space of the corrected thorax shape obtained by correcting the ratio between the horizontal width and vertical width of the similar thorax shapes. As one example, the processing unit 12 aligns the center of the corrected thorax shape with the position of the centerline at the corresponding height in the corrected thorax shape. By doing so, the curvature of the cuter edge of the thorax when locking in the width direction is accurately reproduced in the thorax model.

In the process of deciding the position of the three-dimensional shape of the heart within the three-dimensional shape of the thorax, it is possible to perform position matching of a characteristic part of the heart. One example of a characteristic part is the cardiac apex. In this case, the processing unit 12 decides the position of this characteristic part in the three-dimensional shape of the heart within the three-dimensional shape of the thorax based on the position of the characteristic part of the heart within the thorax in an X-ray image. As one example, the processing unit 12 arranges an X-ray image in a three-dimensional space in which the three-dimensional shape of the thorax is defined, and when the three-dimensional shape of the heart has been projected onto the X-ray image from the direction in which the X-ray image was taken, the position at which the characteristic part in the three-dimensional shape of the heart matches the characteristic part in the X-ray image is set as the position of the three-dimensional shape of the heart. By doing so, the three-dimensional shape of the heart is disposed at the correct position inside the three-dimensional shape of the thorax.

In the process of deciding the orientation of the three-dimensional shape of the heart inside the three-dimensional shape of the thorax, an appropriate orientation is decided by rotation about the characteristic part of the heart. In this case, the processing unit 12 rotates the three-dimensional shape of the heart about a plurality of rotational axes that pass through the characteristic part in the shape of the heart. The processing unit 12 then decides the orientation of the three-dimensional shape of the heart within the three-dimensional shape of the thorax based on a result of comparing projected images of the three-dimensional shape of the heart after rotation and the image of the heart appearing in an X-ray image. As one example, the processing unit 12 decides the orientation of the three-dimensional shape of the heart inside the three-dimensional shape of the thorax at the orientation of the three-dimensional shape of the heart when the projected image of the three-dimensional shape of the heart is accurately superimposed on the position of the heart in X-ray images that have been disposed in the three-dimensional space in which the three-dimensional shape of the thorax is defined. By doing so, the orientation of the three-dimensional shape of the heart inside the three-dimensional shape of the thorax is correctly decided.

When determining the orientation of the three-dimensional shape of the heart, as one example, the processing unit 12 decides a rotation pattern for rotating the three-dimensional shape of the heart into an appropriate orientation out of a plurality of rotation patterns for the three-dimensional shape of the heart. In more detail, the processing unit 12 generates a plurality of rotation patterns that specify a ratio between rotational angles about each of a plurality of rotational axes and a rotational angle about an axial vector whose direction of rotation is specified by a ratio. The axial vector is defined as "$\omega=\omega_1 v_1 + \omega_2 v_2 \omega_3 v_3$", where $v_1$, $v_2$, and $v_3$ are mutually perpendicular axes of rotation in three-dimensional space and $\omega_1$, $\omega_2$, and $\omega_3$; are rotational velocities around such axes of rotation.

The processing unit 12 rotates the three-dimensional shape of the heart according to each of the plurality of rotation patterns. The processing unit 12 then decides the orientation of the three-dimensional shape of the heart inside the three-dimensional shape of the thorax based on the result of a comparison between the projected image of the three-dimensional shape of the heart after rotation and the image of the heart appearing in the X-ray image. By defining the direction of rotation using an axial vector in this way, it is possible to easily prevent a plurality of rotation patterns from duplicating the orientations of the three-dimensional shape of the heart after rotation, which improves the processing efficiency.

When the three-dimensional shapes of the heart and the thorax are used for a biological simulation of heart behavior, excitation propagation, and the like, it is possible to set the positions of electrodes for electrocardiogram measurement on the surface of the three-dimensional shape of the thorax. In this case, the processing unit 12 arranges an X-ray image in a three-dimensional space indicating the three-dimensional shape of the thorax. The processing unit 12 then converts the disposed locations of the electrodes for electrocardiogram measurement, which are designated on the X-ray image, into positions on the surface of the three-dimensional shape of the thorax. As one example, the processing unit 12 sets the positions on the three-dimensional surface of the thorax that coincide with the electrode positions in the X-ray image when the three-dimensional surface of the thorax has been projected onto the X-ray image as the positions of the electrodes. By doing so, it is easy to set electrode positions for electrocardiogram measurement.

The heart shape data 3 indicates the three-dimensional shape of the heart using a surface model whose surface is covered with polygons, for example. In the same way, the thorax shape data 4 also indicates the three-dimensional shape of the thorax using a surface model, for example. In this case, in order to use the three-dimensional shapes of the heart and thorax for biological simulation, conversion is performed from data indicating a surface model to computational grid data indicating a solid model whose internal part is defined as a solid (sometimes referred to as a "solid element" or "volume element"). As one example, the processing unit 12 generates the heart shape data 3 indicating the three-dimensional shape of the heart as a first surface model. The processing unit 12 also generates thorax shape data 4 indicating the three-dimensional shape of the thorax as a second surface model. In addition, when the position and orientation of the three-dimensional shape of the heart have been decided, the processing unit 12 arranges the first surface model at the decided position and orientation inside the second surface model. The processing unit 12 then generates, based on the first surface model and the second surface model, computational grid data 5 indicating a solid model of the thorax which accommodates the heart. By doing so, it is possible to easily generate the computational grid data 5 that may be used in a biological simulation.

Second Embodiment

Figure 2:
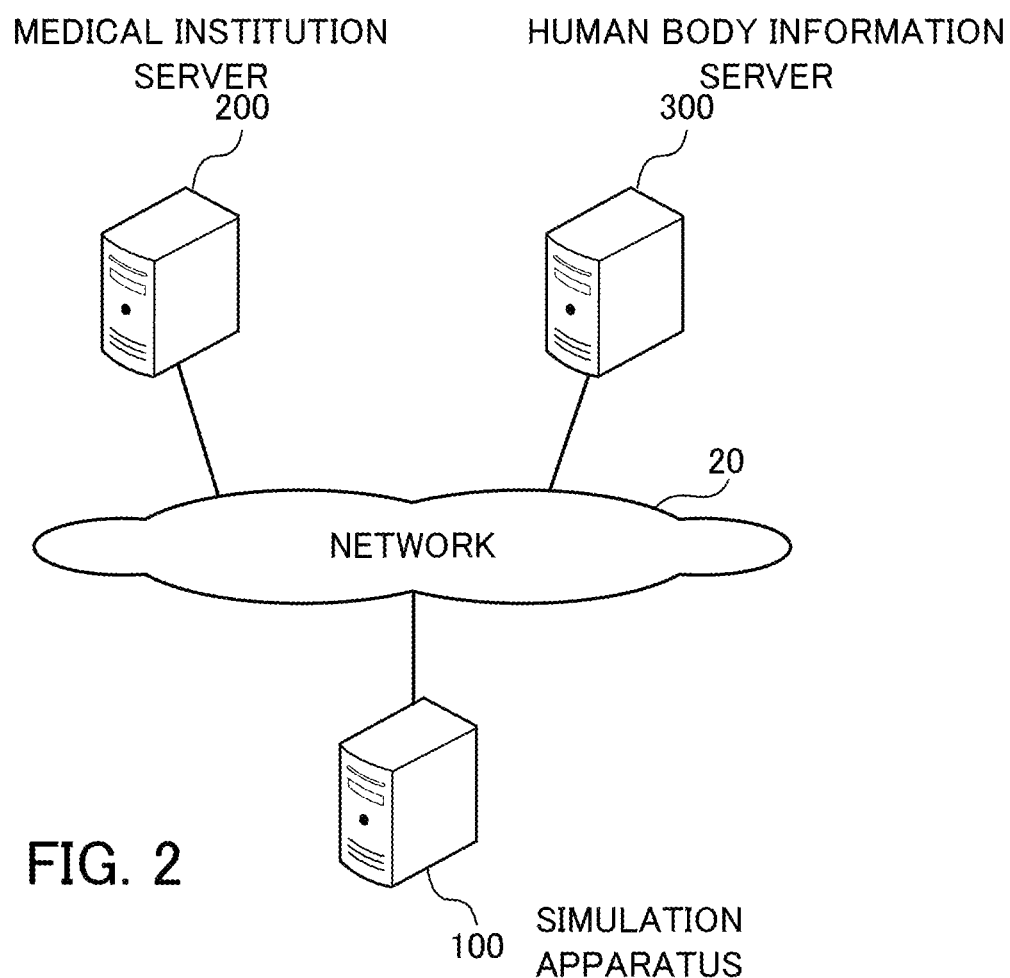
FIG. 2 depicts one example of a system configuration.

The second embodiment is a computer system for performing a biological simulation using a three-dimensional model that reproduces the patient's thorax and heart that has been placed inside the thorax.
System Configuration FIG. 2 depicts one example of a system configuration. In the example of FIG. 2, a medical institution server 200, a human body information server 300, and a simulation apparatus 100 are connected via a network 20. The medical institution server 200 is a computer that manages records of examinations and tests of patients at a medical institution. The medical institution server 200 includes, as examples, medical image data and diagnostic results based on such image data. The medical image data includes echo images, X-ray images, and the like. The human body information server 300 is a computer in which statistical information relating to the dimensions and shapes of human body is stored.

The simulation apparatus 100 acquires, from the medical institution server 200, data relating to a patient who is the subject of a biological simulation and generates computational grid data to be used in the biological simulation. Note that the simulation apparatus 100 generates a thorax shape to appear in the computational grid data based on data indicating the average shape of the thorax acquired from the human body information server 300. The simulation apparatus 100 performs a biological simulation using the generated computational grid data. As the result of the biological simulation, the simulation apparatus 100 outputs electrocardiogram data indicating an electrocardiogram, for example.

Figure 3:
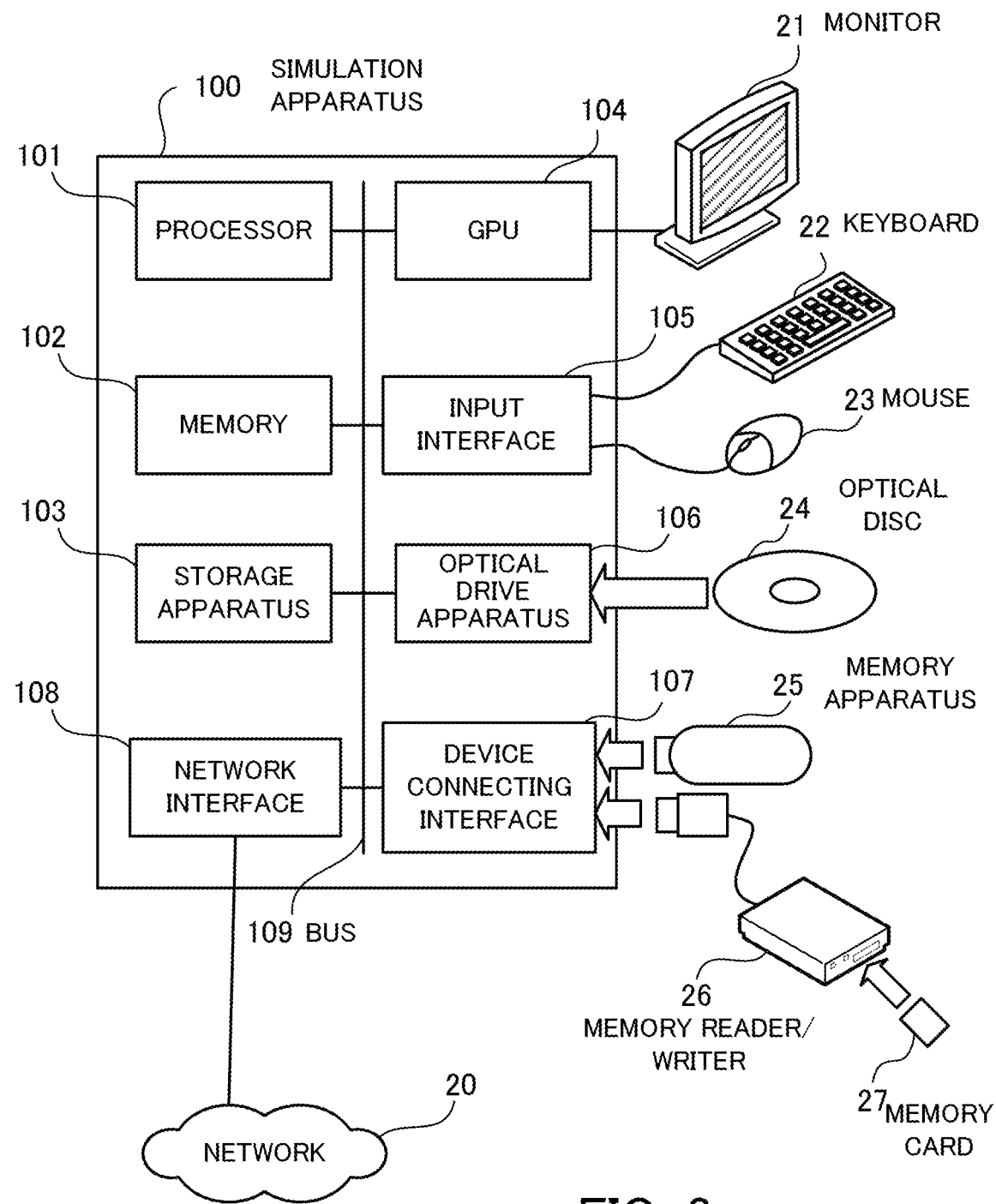
FIG. 3 depicts example hardware of a simulation apparatus.

FIG. 3 depicts example hardware of a simulation apparatus. Overall control of the simulation apparatus 100 is performed by a processor 101. A memory 102 and a plurality of peripheral devices are connected via a bus 109 to the processor 101. The processor 101 may be a multiprocessor. As examples, the processor 101 is a central processing unit (CPU), a micro processing unit (MPU), or a digital signal processor (DSP). At least some of the functions realized by the processor 101 executing a program may be realized by an electronic circuit, such as an application specific integrated circuit (ASIC) or a programmable logic device (PLD).

The memory 102 is used as a main storage apparatus of the simulation apparatus 100. The memory 102 temporarily stores at least part of an operating system (OS) program and application programs to be executed by the processor 101. The memory 102 also stores various data to be used in processing by the processor 101. As one example, a volatile semiconductor memory apparatus, such as random access memory (RAM), is used as the memory 102.

The peripheral devices connected to the bus 109 include a storage apparatus 103, a graphics processing unit (GPU) 104, an input interface 105, an optical drive apparatus 106, a device connecting interface 107, and a network interface 108.

The storage apparatus 103 electrically or magnetically performs reads and writes of data to and from an internally provided recording medium. The storage apparatus 103 is used as an auxiliary storage apparatus of the simulation apparatus 100. The storage apparatus 103 stores an OS program, application programs, and various data. Note that a hard disk drive (HDD) or a solid state drive (SSD) may be used as examples of the storage apparatus 103.

The GPU 104 is a computational apparatus that performs image processing, and is also referred to as a "graphics controller". A monitor 21 is connected to the GPU 104. The GPU 104 displays images on a screen of the monitor 21 according to instructions from the processor 101. Examples of the monitor 21 include a display apparatus that uses organic EL (Electro Luminescence), a liquid crystal display apparatus, or the like.

A keyboard 22 and a mouse 23 are connected to the input interface 105. The input interface 105 transmits signals sent from the keyboard 22 and/or the mouse 23 to the processor 101. Note that the mouse 23 is one example of a pointing device, and other pointing devices may also be used. Other examples of pointing devices include touch panels, tablets, touchpads, and trackballs.

The optical drive apparatus 106 uses laser light or the like to perform reads of data that has been recorded onto an optical disc 24 or writes of data onto the optical disc 24. The optical disc 24 is a portable recording medium on which data is recorded so that the data may be read by way of reflected light. The optical disc 24 may be a digital versatile disc (DVD), a DVD-RAM, a compact disc read-only memory (CD-ROM), a CD-R (Recordable)/RW (ReWritable), or the like.

The device connecting interface 107 is a communication interface for connecting peripheral devices to the simulation apparatus 100. As examples, the device connecting interface 107 may be connected to a memory apparatus 25 and a memory reader/writer 26. The memory apparatus 25 is a recording medium equipped with a communication function for communicating with the device connecting interface 107. The memory reader/writer 26 is an apparatus that performs writes of data onto a memory card 27 or reads of data from the memory card 27. The memory card 27 is a card-type recording medium.

The network interface 108 is connected to the network 20. The network interface 108 transmits and receives data to and from other computers or communication devices via the network 20. The network interface 108 is a wired communication interface that is connected by a cable to a wired communication apparatus, such as a switch or router. However, the network interface 108 may be a wireless communication interface that communicates with a wireless communication apparatus, such as a base station or an access point, via radio waves.

The simulation apparatus 100 implements the processing functions of the second embodiment using the hardware described above. Note that the information processing apparatus 10 described in the first embodiment may also be realized by the same hardware as the simulation apparatus 100 depicted in FIG. 3.

The simulation apparatus 100 realizes the processing functions of the second embodiment by executing a program recorded in a computer-readable recording medium, for example. A program in which the content of processing to be executed by the simulation apparatus 100 may be recorded on various types of recording medium. As one example, a program to be executed by the simulation apparatus 100 may be stored in advance in the storage apparatus 103. The processor 101 loads at least part of the program in the storage apparatus 103 into the memory 102 and executes the program. The program to be executed by the simulation apparatus 100 may also be recorded on a portable recording medium, such as the optical disk 24, the memory apparatus or the memory card 27. A program stored in a portable recording medium may be executed after being installed in the storage apparatus 103 under the control of the processor 101, for example. Alternatively, the processor 101 may read and execute the program directly from the portable recording medium.

Overview of Three-Dimensional Shape Data Generation and Biological Simulation

The simulation apparatus 100 acquires data of a patient designated as the subject of a biological simulation from the medical institution server 200 and generates computational grid data indicating three-dimensional shapes including the patient's thorax and heart as solid models.

The simulation apparatus 100 then uses the generated computational grid data to perform a biological simulation of the propagation of cardiac excitation, and outputs data indicating an electrocardiogram as the result of the biological simulation. As one example, when an operation that implants a CRT apparatus in a patient is planned, the simulation apparatus 100 may be used to confirm the effect of implanting the CRT apparatus.

The ability to confirm in advance the effect of implanting a CRT apparatus is important in reducing the burden placed on the patient. As one example, for CRT, around 30% of patients do not obtain a sufficient effect even when treatment is performed. When it is known in advance before an operation is performed that CRT is unlikely to be effective, the imposition of an unnecessary physical burden on the patient may be avoided.

In addition, without conducting a biological simulation, it is difficult to predict appropriate locations for installing the electrodes of a CRT apparatus. When a biological simulation is not performed, a physician will have to search for optimal electrode positions through trial and error during CRT apparatus implanting surgery. As a result, this prolongs the surgery and increases the burden on the patient. By performing a biological simulation in advance, appropriate electrode positions may be specified before surgery, which shortens the operation. As a result, the burden placed on the patient may be reduced.

Electrocardiogram data may be used to predict the effects of CRT. As one example, the width of QRS waves may be used to determine the effect of implanting a CRT apparatus on improving impaired heart function. To accurately predict the effect of treatment based on electrocardiogram data outputted by a biological simulation, it is important for the electrocardiogram data to accurately represent the post-treatment state of the patient. To obtain accurate electrocardiogram data, it is important to generate computational grid data that accurately reproduces the features of the patient's body.

To generate computational grid data, first, three-dimensional shape data indicating the three-dimensional shapes of the heart and thorax of the patient is generated. Medical image data obtained by imaging of the patient's heart is used to generate three-dimensional shape data of the patient. By generating heart shape data indicating a three-dimensional model of the heart (or "cardiac model") that reflects the characteristics of the patient's heart appearing in medical images, it is possible to accurately reproduce how the heart operates in keeping with the patient's condition through a biological simulation. Note that a cardiac model is an example of the three-dimensional shape of the heart mentioned in the first embodiment.

Medical image data for the heart includes CT image data, MRI (Magnetic Resonance Imaging) image data, echo image data, and the like. Out of these, CT image data is generated by imaging of a patient with a CT apparatus. During imaging with a CT apparatus, the patient is exposed to a larger dose of radiation than during X-ray imaging. This means that a large physical burden is placed on the patient to obtain CT image data. Since MRI image data is generated by magnetic resonance using an MRI apparatus, the patient is not exposed to radiation. However, an MRI apparatus has a wider interval (pitch) between tomographic images compared to images that taken with a CT apparatus. This means that even when three-dimensional shape data indicating the physical characteristics of a patient were generated using cross-sectional images obtained by an MRI apparatus, it would be difficult to generate the three-dimensional shape data with high accuracy.

Echo image data may be obtained using an ultrasonic diagnostic apparatus. Ultrasonic diagnostic apparatuses are smaller than CT apparatuses or MRI apparatuses and are owned by many medical institutions. In addition, taking echo images using an ultrasonic diagnostic apparatus places little physical burden on the patient. For this reason, the simulation apparatus 100 generates heart shape data based on echo image data of the patient.

The simulation apparatus 100 also generates thorax shape data based on X-ray image data. The thorax shape data is data indicating a three-dimensional model (or "thorax model") that reproduces the shape of the patient's thorax. Note that this thorax model is one example of the three-dimensional shape of the thorax described in the first embodiment. The X-ray image data is generated by X-raying a patient with an X-ray apparatus. Although a patient is irradiated with X-rays during X-ray imaging, the patient is exposed to a smaller dose of radiation than with a CT apparatus.

The simulation apparatus 100 generates the computational grid data based on the heart shape data and the thorax shape data. The computational grid data is data indicating a three-dimensional solid model where the heart model has been placed inside the thorax model.

Figure 4:
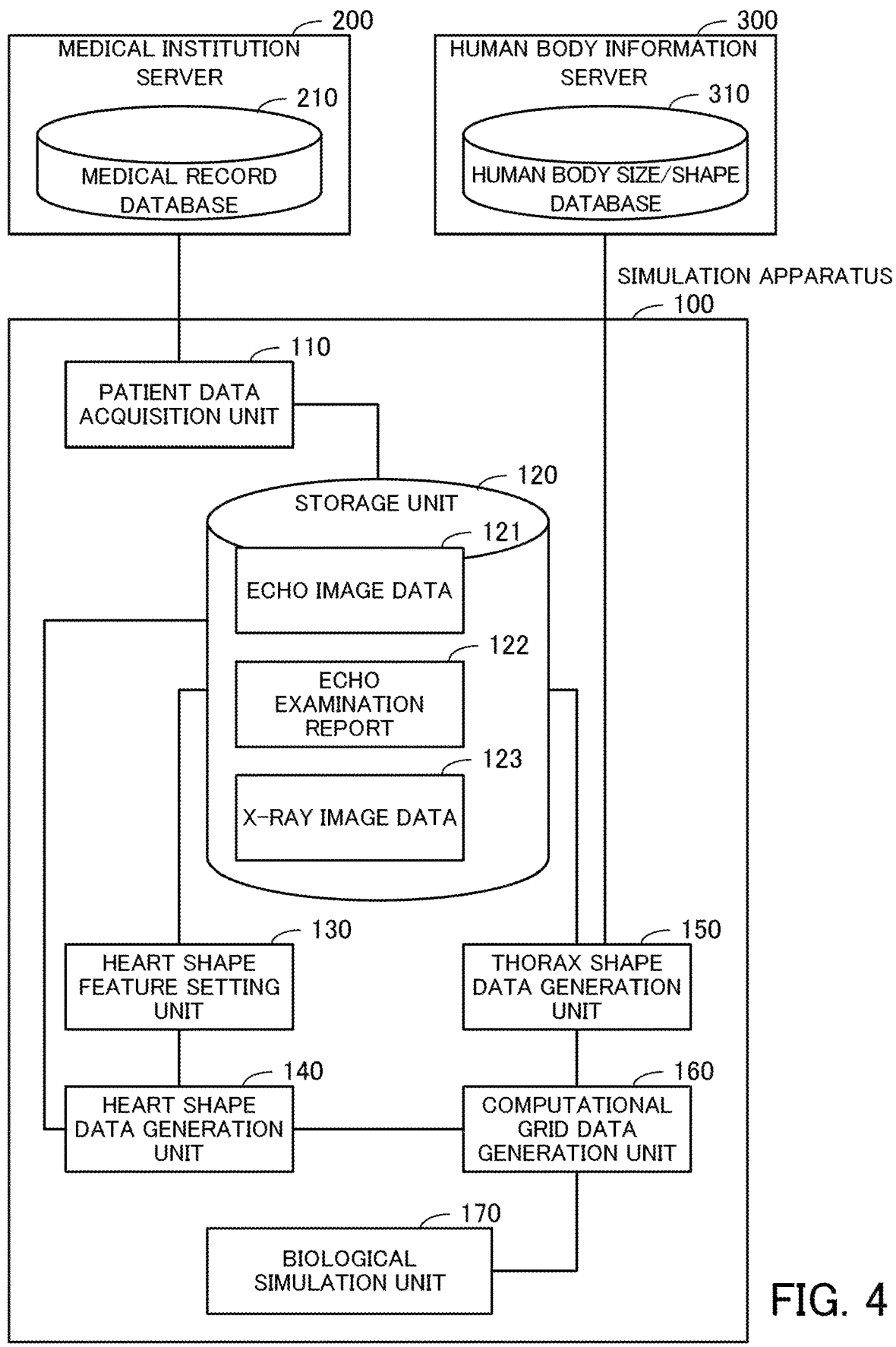
FIG. 4 is a block diagram depicting example functions of the simulation apparatus.

FIG. 4 is a block diagram depicting example functions of the simulation apparatus. The simulation apparatus 100 acquires data used for generating heart shape data from the medical institution server 200. The simulation apparatus 100 also acquires data used to generate the thorax shape data from the human body information server 300. The medical institution server 200 includes a medical record database (DB) 210 that stores medical records of many patients who have received medical services, such as testing and treatment at medical institutions. The human body information server 300 includes a human body size/shape database 310 in which statistical information on human body dimensions and shapes is stored. The simulation apparatus 100 acquires the thorax shape statistical data from the human body size/shape database 310 and uses this data to generate thorax shape data indicating the shape of the patient's thorax.

The simulation apparatus 100 includes a patient data acquisition unit 110, a storage unit 120, a heart shape feature setting unit 130, a heart shape data generation unit 140, a thorax shape data generation unit 150, a computational grid data generation unit 160, and a biological simulation unit 170.

The patient data acquisition unit 110 acquires, from the medical institution server 200, data of the patient designated as the subject. In response to inputting of patient identification information, the patient data acquisition unit 110 acquires echo image data 121, an echo examination report 122, and X-ray image data 123 of that patient from the medical record database 210 of the medical institution server 200. The patient data acquisition unit 110 stores the acquired data in the storage unit 120.

The storage unit 120 stores the echo image data 121, the echo examination report 122, and the X-ray image data 123. The echo image data 121 is image data of cross-sectional images of the patient's heart acquired by imaging by an ultrasonic diagnostic apparatus. The echo image data 121 is three-dimensional (3D) echo image data, for example. In three-dimensional echo image data, the cross-sectional shape of the heart may be reproduced in a three-dimensional coordinate system. The echo examination report 122 is data in which a doctor's findings are written based on the echo image data 121. The echo examination report 122 includes information such as whether septal thinning of the heart has occurred, for example. The echo examination report 122 also includes numerical values indicating the thickness of the myocardium. The X-ray image data 123 is image data of the patient's chest produced by imaging with an X-ray apparatus. The X-ray image data 123 includes image data produced by x-raying the patient from a plurality of directions. As one example, the X-ray image data 123 includes image data produced by x-raying the patient from the front and image data produced by x-raying the patient from the side.

The processing of the heart shape feature setting unit 130, the heart shape data generation unit 140, the thorax shape data generation unit 150, the computational grid data generation unit 160, and the biological simulation unit 170 will now be described with reference to FIG. 5.

Figure 5:
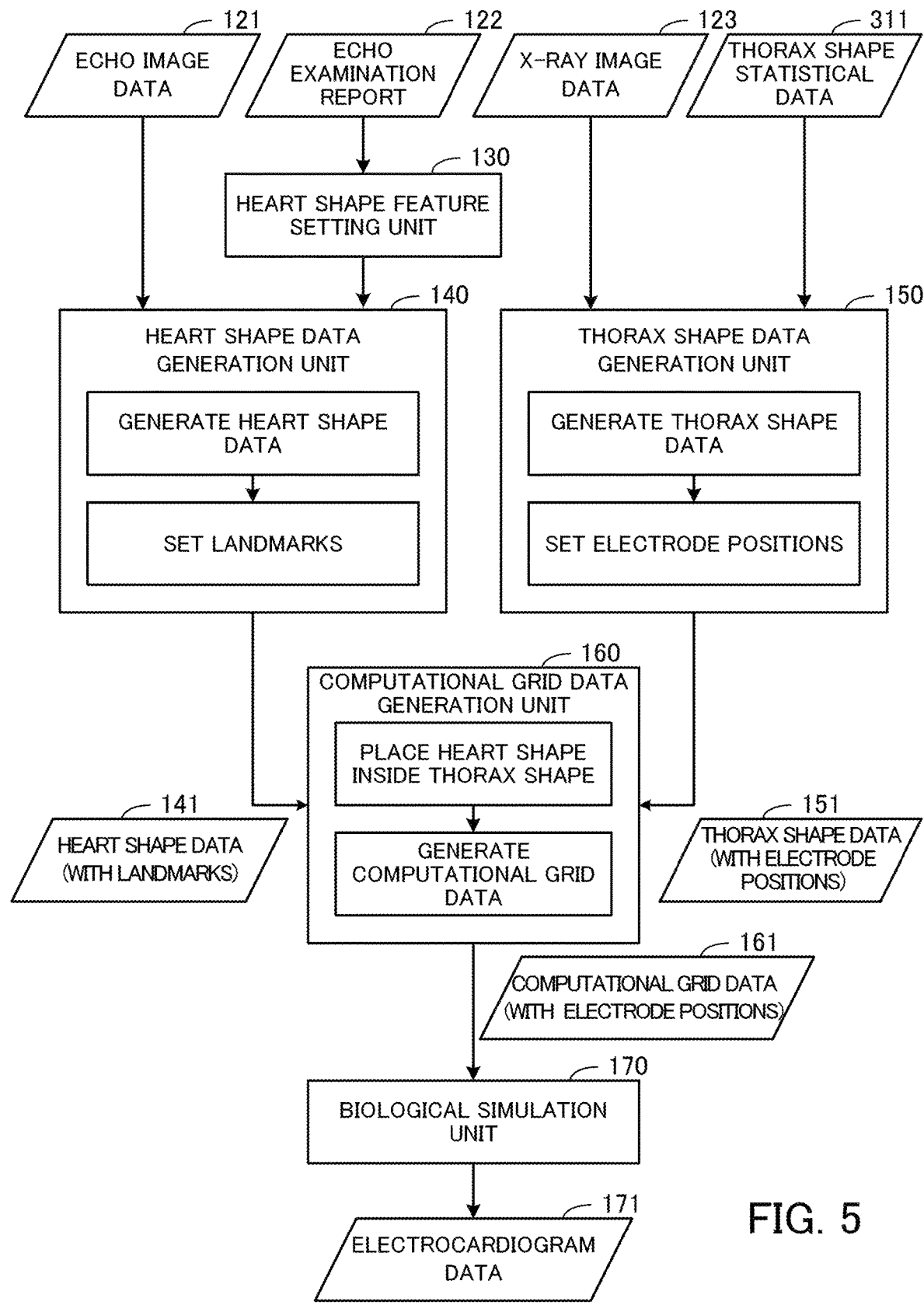
FIG. 5 depicts an example flow of processing in a case where a biological simulation of propagation of cardiac excitation is performed.

FIG. 5 depicts an example flow of processing in the case where a biological simulation of propagation of cardiac excitation is performed.

The heart shape feature setting unit 130 analyzes the echo examination report 122 and extracts information indicating features in the shape of the heart. The heart shape feature setting unit 130 then transmits the extracted information to the heart shape data generation unit 140. As one example, the heart shape feature setting unit 130 transmits information indicating the thickness of the myocardium to the heart shape data generation unit 140.

Based on the echo image data 121, the heart shape data generation unit 140 generates heart shape data 141 for indicating the shape of the patient's heart using a three-dimensional heart model. When the heart shape data generation unit 140 has acquired information indicating the features of the patient's heart from, the heart shape feature setting unit 130, the heart shape data generation unit 140 corrects the heart shape data 141 according to the acquired information.

In addition, the heart shape data generation unit 140 generates a heart model based on the heart shape data 141 and receives an input that sets a landmark in the heart model. The heart shape data generation unit 140 acquires the position of the inputted landmark and adds position information for the landmark to the heart shape data 141. The heart shape data generation unit 140 transmits the heart shape data 141 with the added landmark to the computational grid data generation unit 160.

The thorax shape data generation unit 150 generates thorax shape data 151 based on the X-ray image data 123. As one example, the thorax shape data generation unit 150 acquires thorax shape statistical data 311 from the human body size/shape database 310 of the human body information server 300. The thorax shape statistical data 311 indicates the dimensions and shape (for example, the cross-sectional shape) at a plurality of locations on the chest of a plurality of humans. The thorax shape data generation unit 150 then corrects the average thorax shape for the gender of the patient according to the actual thorax shape of the patient appearing in the X-ray image data 123, and generates the thorax shape data 151 indicating the shape of the patient's thorax. When outputting electrocardiogram data as the result of a biological simulation, the thorax shape data generation unit 150 sets electrodes for electrocardiogram measurement on the thorax model indicated by the thorax shape data 151 and includes data indicating the positions of the electrodes in the thorax shape data 151. The thorax shape data generation unit 150 transmits the generated thorax shape data 151 to the computational grid data generation unit 160.

The computational grid data generation unit 160 generates the computational grid data based on the heart shape data 141 and the thorax shape data 151. As one example, the computational grid data generation unit 160 decides the position and orientation of the heart model indicated by the heart shape data 141 inside the thorax model indicated by the thorax shape data 151. The computational grid data generation unit 160 then generates computational grid data 161 by filling the insides of the surface shapes of the heart and the thorax indicated by the heart model and the thorax model with voxels. The computational grid data generation unit 160 transmits the generated computational grid data 161 to the biological simulation unit 170.

The biological simulation unit 170 executes a biological simulation based on the computational grid data 161 acquired from the computational grid data generation unit 160. As one example, the biological simulation unit 170 executes a biological simulation of propagation of cardiac excitation and outputs electrocardiogram data 171 indicating an electrocardiogram, produced by observing excitation propagation.

Note that the lines connecting the elements depicted in FIG. 5 indicate some of the communication paths in use. Communication paths aside from the illustrated communication paths may also be set. The functions of the respective elements depicted in FIG. 5 may be realized by causing a computer to execute program modules corresponding to the respective elements, for example.

In the following description, a heart shape data generation process, a landmark setting process, a thorax shape data generation process, an electrode position setting process, and a placement process for placing the heart shape inside the thorax shape will be described.

Heart Shape Data Generation Process

First, the heart shape data generation process will be described in detail. When a patient who is the subject has been designated and customer data of the patient has been acquired from the medical record database 210, the heart shape data generation unit 140 performs the heart shape data generation process.

Figure 6:
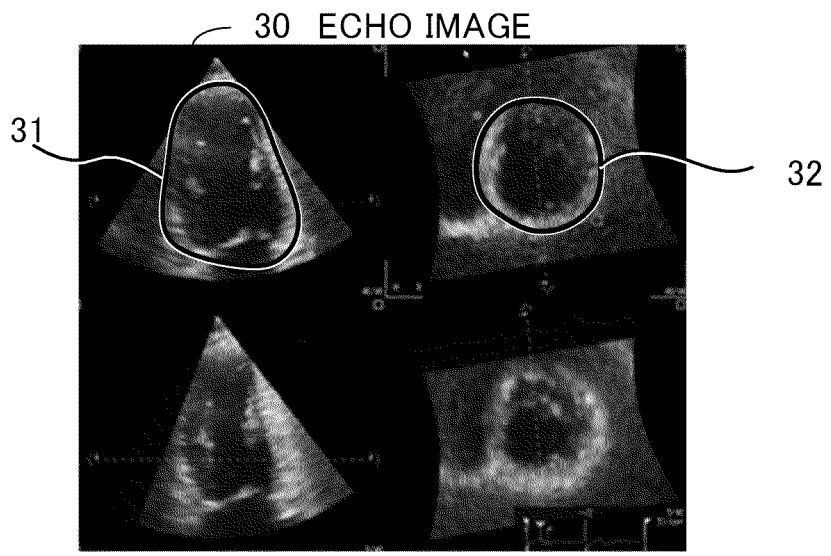
FIG. 6 depicts an example of a heart shape data generation process.
Figure 6:
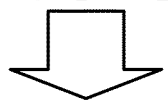
Figure 6:
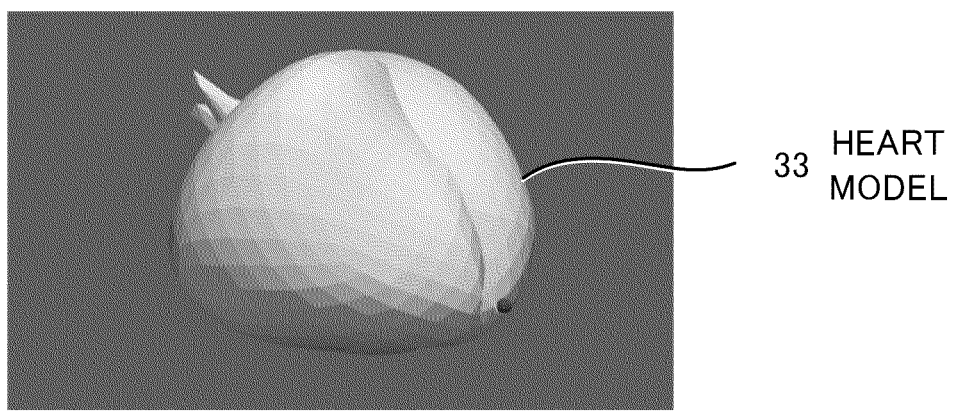
Figure 6:
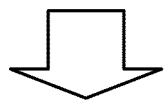

FIG. 6 depicts an example of the heart shape data generation process. As one example, the heart shape data generation unit 140 displays an echo image 30 included in the echo image data 121 on the monitor 21. Vertical direction cross-sections of the heart are displayed on the right side of the echo image 30. Width direction cross-sections of the heart are displayed on the left side of the echo image 30.

The user designates predetermined boundaries 31 and 32, such as the left ventricular endocardium, in the echo image 30. Based on the designated boundaries, the heart shape data generation unit 140 segments the left ventricle lumen of the heart and the like in the echo image 30. The heart shape data generation unit 140 generates a three-dimensional surface model by covering the surface of the regions determined by the segmentation with polygons. This surface model is a heart model 33 indicating the three-dimensional shape of the patient's heart.

The heart shape data generation unit 140 then outputs data on the polygons that construct the heart model 33 as the heart shape data 141. The polygon data includes the numbers of the vertices that construct each polygon, three-dimensional positional coordinates of each vertex, and the like.

Note that examples of the boundaries designated for segmentation purposes are the outer edge of the left ventricular lumen, the left ventricular epicardium, and the epicardium covering the two ventricles. The myocardial region of the left ventricle may be specified using the outer edge of the left ventricular lumen and the left ventricular epicardium. The thickness of the myocardium is known from, the myocardial region of the left ventricle. Out of a region of ventricles that starts from the epicardium and extends inward by the thickness of the myocardium, a region aside from the myocardial region of the left ventricle will be the myocardial region of the right ventricle. A region inside the myocardial region of the right ventricle is the right ventricular lumen. The myocardial region between the right ventricular lumen and the left ventricular lumen is the septum.

Figure 7:
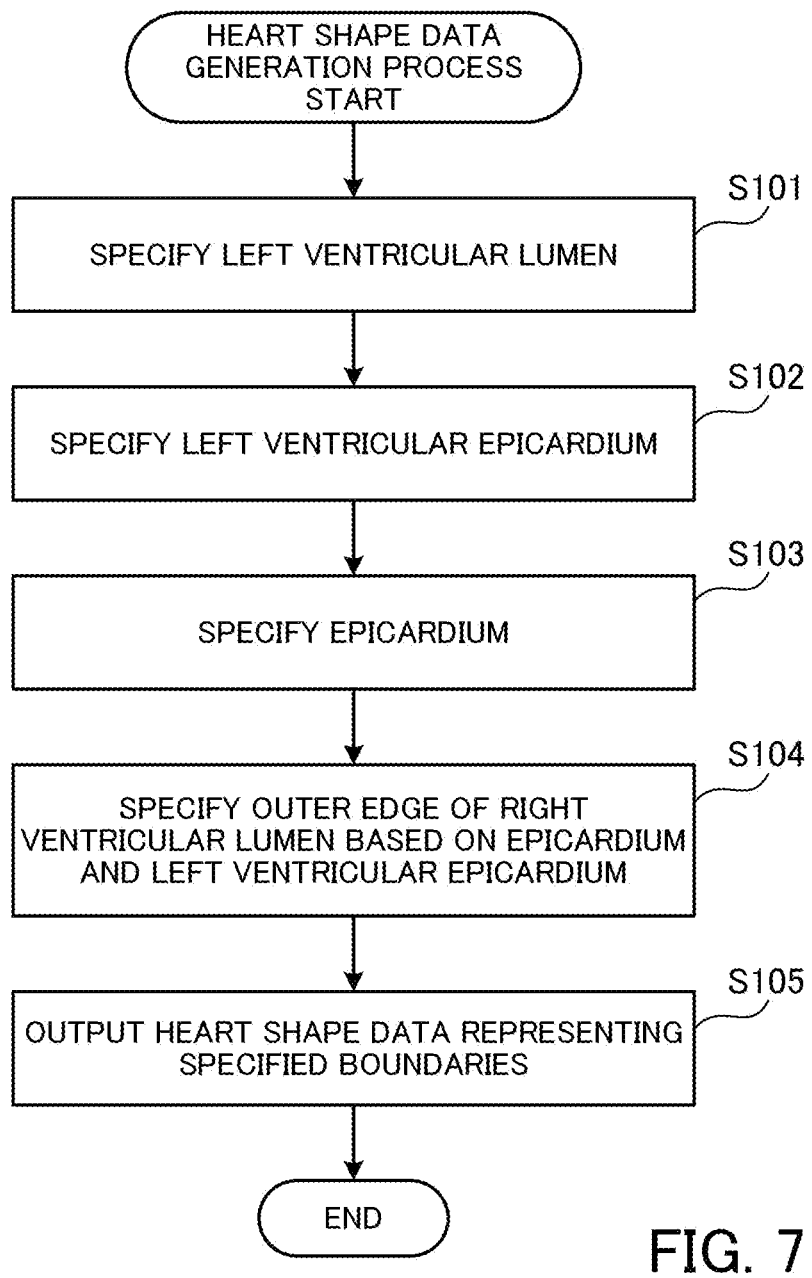
FIG. 7 is a flowchart depicting an example procedure of a heart shape data generation process.

FIG. 7 is a flowchart depicting an example procedure of the heart shape data generation process. The processing depicted in FIG. 7 will now be described in order of the step numbers.

[Step S101] The heart shape data generation unit 140 specifies the position of the outer edge of the left ventricular lumen in the echo image based on an input from the user designating a boundary indicating the outer edge of the left ventricular lumen.

[Step S102] The heart shape data generation unit 140 specifies the position of the left ventricular epicardium in the echo image based on an input from the user designating the left ventricular epicardium. The left ventricular epicardium specified here includes the left ventricular lumen-side surface of the septum.

[Step S103] The heart shape data generation unit 140 specifies the position of the epicardium in the echo image based on an input from the user designating a boundary indicating the epicardium that covers the two ventricles. At this time, the heart shape data generation unit 140 corrects the position of the epicardium using information relating to the thickness of the myocardium acquired from the heart shape feature setting unit 130.

[Step S104] The heart shape data generation unit 140 specifies the positions of the outer edge of the right ventricular lumen based on the positions of the epicardium and the left ventricular epicardium. As one example, the heart shape data generation unit 140 specifies a region that is inside the epicardium by at least the thickness of the myocardium but is outside the left ventricular epicardium as the right ventricular lumen.

[Step S105] The heart shape data generation unit 140 generates and outputs heart shape data indicating the specified boundaries.

In this way, when the user has specified the positions of boundaries, such as the outer edge of the left ventricular lumen, in an echo image using a mouse or the like, the heart shape data generation unit 140 generates heart shape data.

Figure 8:
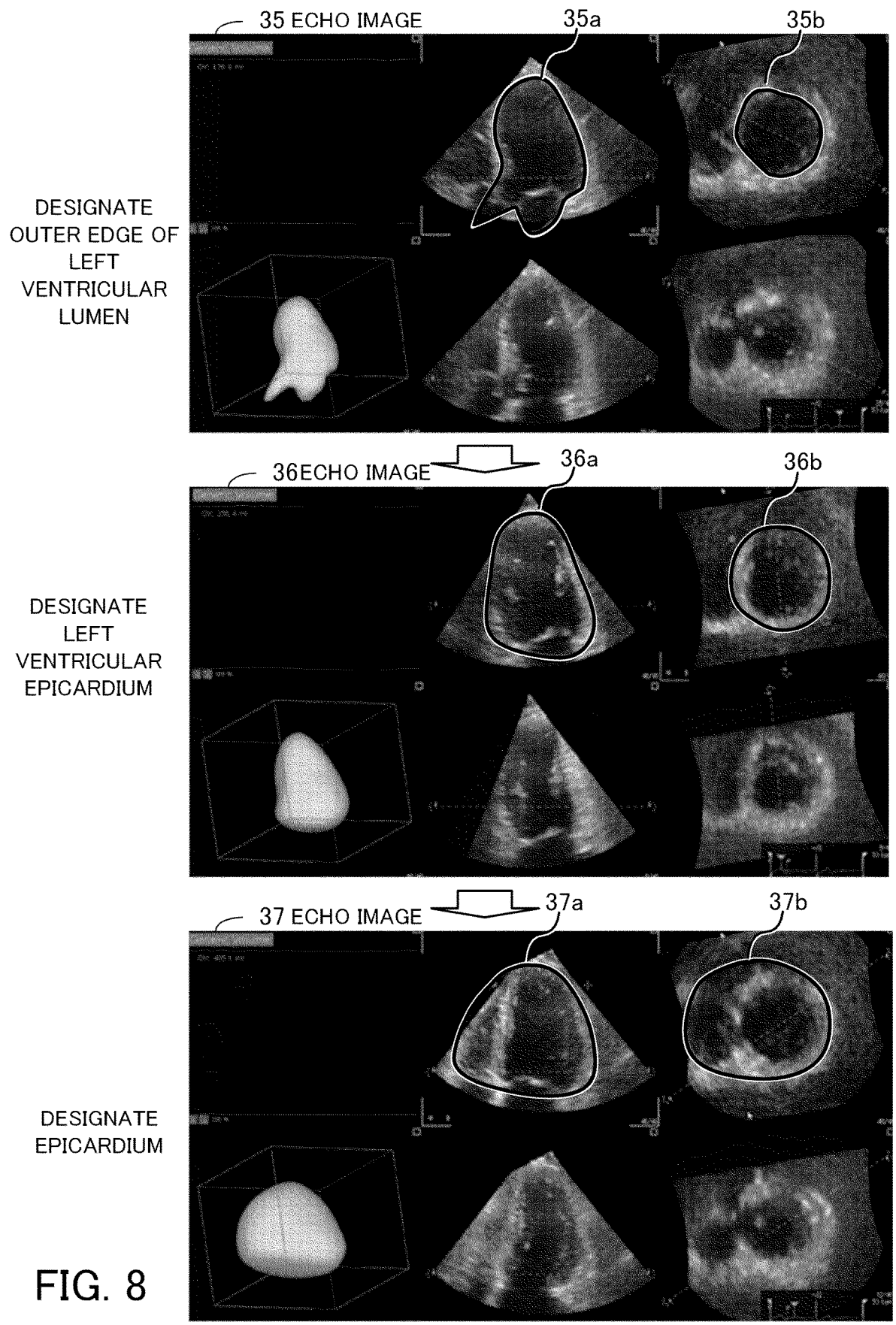
FIG. 8 depicts an example of an input designating the position of a boundary in an echo image.

FIG. 8 depicts an example of an input designating the position of a boundary in an echo image. First, the user designates the positions of the outer edges 35a and 35b of the left ventricular lumen from the echo image 35. As one example, the user operates the mouse 23 to designate a plurality of positions on the outer edges 35a and 35b of the left ventricular lumen. The heart shape data generation unit 140 generates closed curves that smoothly connect the designated positions and specifies the closed curves as the outer edges 35a and 35b of the left ventricular lumen.

It is also possible for the user to designated positions on the outer edges of the left ventricular lumen in other echo images in which the position of the cross section of the heart differs from the echo image 35 depicted in FIG. 8. In this case, the heart shape data generation unit 140 generates closed curves that smoothly connect the designated positions, and specifies the closed curves as the outer edges of the left ventricular lumen. By specifying the outer edges of the left ventricular lumen from a plurality of echo images, the generation accuracy of the three-dimensional shape of the left ventricular lumen is improved.

Next, the user designates the positions of the left ventricular epicardium 36a and 36b from the echo image 36. As one example, the user operates the mouse 23 to designate a plurality of positions on the left ventricular epicardium 36a and 36b. The heart shape data generation unit 140 generates closed curves that smoothly connect the designated positions, and specifies the closed curves as the positions of the left ventricular epicardium 36a and 36b.

It is also possible for the user to designate the position of the left ventricular epicardium in other echo images in which the position of the cross section of the heart is different from the echo image 36 depicted in FIG. 8. In this case, the heart shape data generation unit 140 generates closed curves that smoothly connect the designated positions, and identifies the closed curves as the left ventricular epicardium. By specifying the left ventricular lumen from a plurality of echo images, the accuracy of generating the three-dimensional shape of the left ventricular epicardium is improved.

Next, the user designates the positions of the epicardium 37a and 37b from the echo image 37. As one example, the user operates the mouse 23 to designate a plurality of positions on the epicardium 37a and 37b. The heart shape data generation unit 140 generates closed curves that smoothly connect the designated positions, and specify the closed curves as the positions of the epicardium 37a and 37b.

It is also possible for the user to designate the position of the epicardium in other echo images in which the position of the cross section of the heart is different from the echo image 37 depicted in FIG. 8. In this case, the heart shape data generation unit 140 generates a closed curve that smoothly connects the designated positions, and specifies the closed curve as the epicardium. By specifying the epicardium from a plurality of echo images, the accuracy of generating the three-dimensional shape of the epicardium is improved.

The heart shape data generation unit 140 generates polygons that construct a three-dimensional boundary surface based on the boundaries (that is, the outer edges 35a and 35b of the left ventricular lumen, the left ventricular epicardium 36a and 36b, the epicardium 37a and 37b, and the like) specified by closed curves on the echo images 35 to 37.

As one example, the heart shape data generation unit 140 generates a curved surface such as a spline curved surface that passes through the closed curves indicating the outer edges 35a and 35b of the left ventricular lumen, and divides the curved surface into polygons. The heart shape data generation unit 140 also generates a curved surface such as a spline curved surface that passes through the closed curves indicating the left ventricular epicardium 36a and 36b, and divides the curved surface into a plurality of polygons. In the same way, the heart shape data generation unit 140 also generates a curved surface such as a spline curved surface that passes through the closed curves indicating the epicardium 37a and 37b, and divides the curved surface into a plurality of polygons.

A set of polygons (or "STL data") generated from the echo images in this way form the heart model 33.

Figure 9:
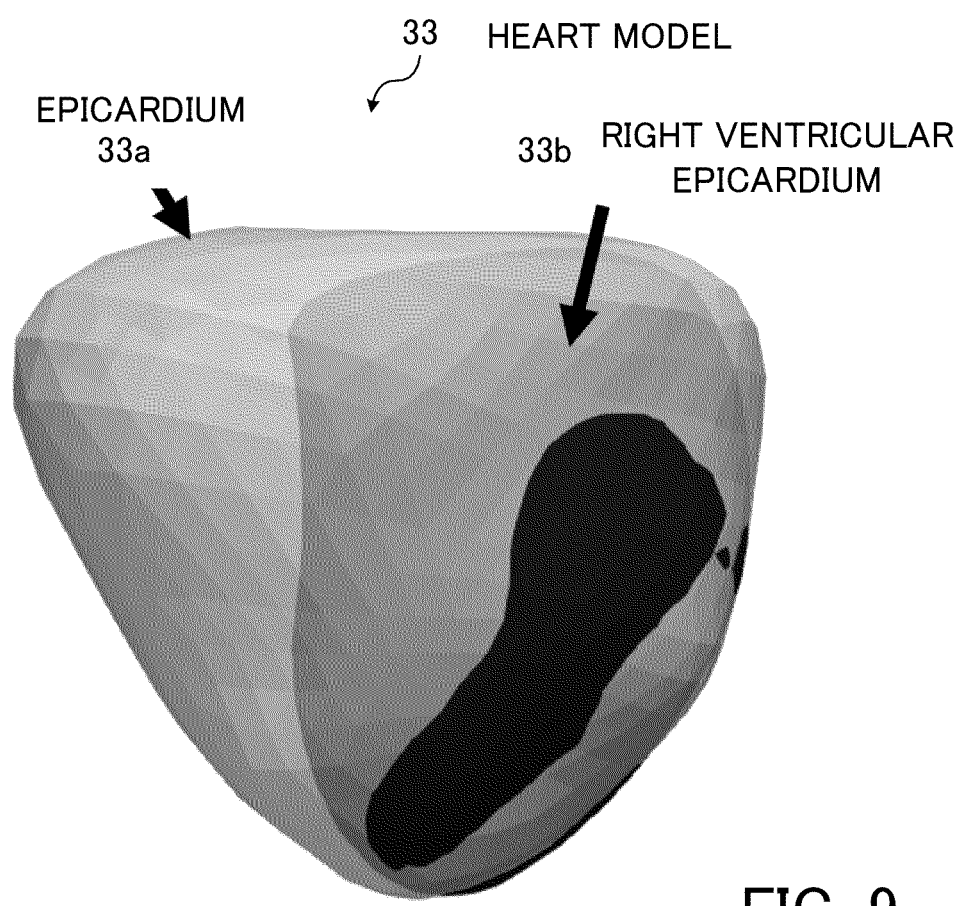
FIG. 9 depicts an example of a heart model.

FIG. 9 depicts an example of a heart model. The external shape of the heart model 33 is represented by polygons indicating the epicardium 33a. Polygons that indicate the left ventricular epicardium 33b are present inside the heart model 33. The polygons indicating the left ventricular epicardium 33b include the boundary between the septum and the right ventricle. Inside the left ventricular epicardium 33b, a boundary surface indicating the outer edge of the left ventricular lumen (which is the same as the left ventricular endocardium) is represented by polygons. Out of the left ventricular epicardium 33b, a region between a boundary portion that does not coincide with the epicardium 33a and the left ventricular lumen is the septum region.

In this way, the heart shape data generation unit 140 semi-automatically extracts the three-dimensional shapes of the outer edge of the left ventricular lumen and the septum obtained from the echo images, and may generate natural ventricle shapes by combining the extracted data with the three-dimensional shape of the ventricular epicardium. The heart shape data generation unit 140 also makes effective use of information presented in the echo examination report 122 to improve the accuracy of the ventricle shape indicating the patient's heart.

Figure 10:
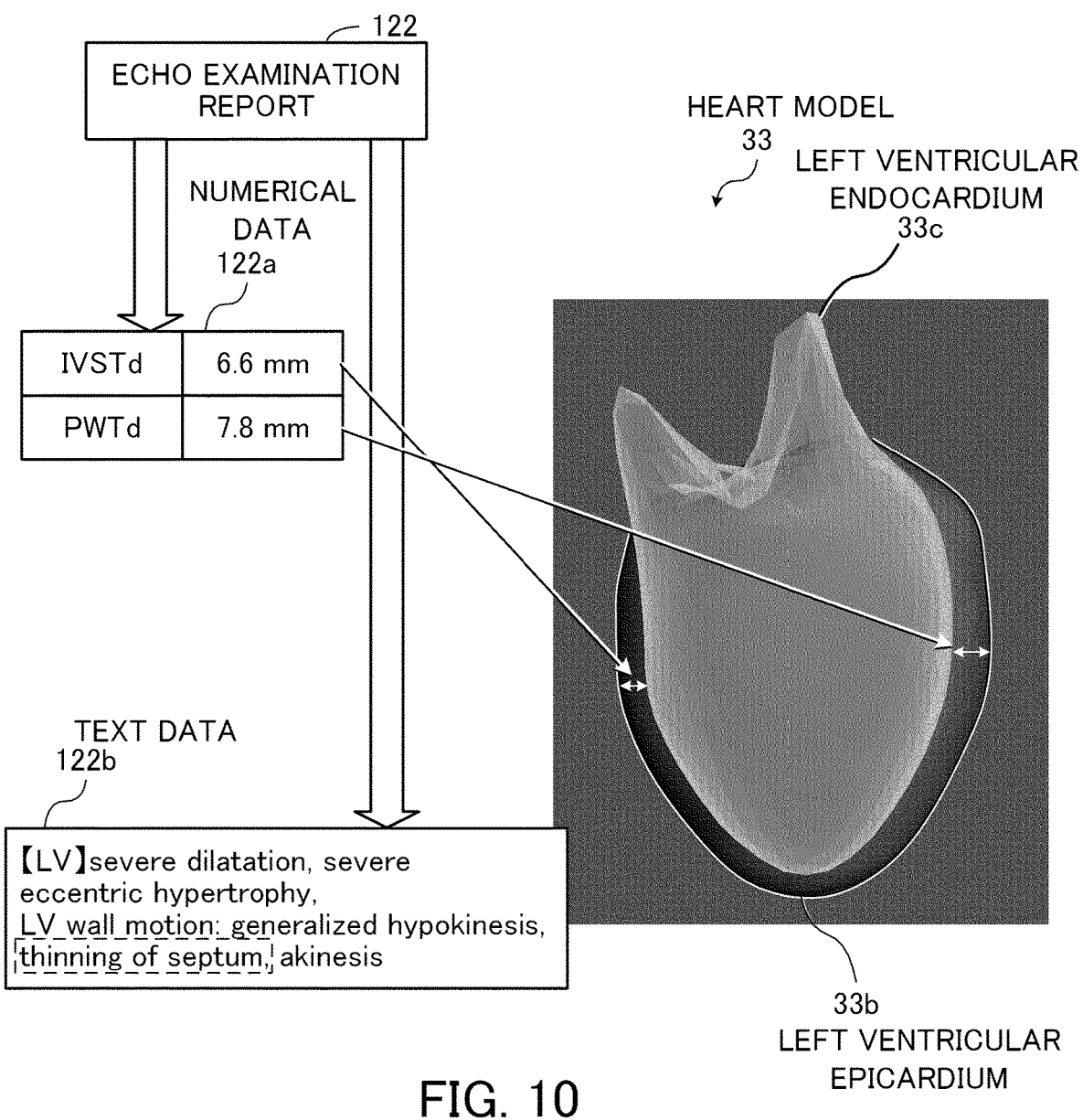
FIG. 10 depicts an example correction of a heart model based on information in an echo examination report.

FIG. 10 depicts an example correction of a heart model based on information in an echo examination report. As examples, numerical data 122a indicating the thickness of the myocardium and text data 122b relating to the thickness of the myocardium are extracted from the echo examination report 122. The numerical data 122a includes values such as intraventricular septum thickness (IVSTd) and diastolic left ventricle posterior wall thickness (PWTd).

As one example, the user checks the numerical data 122a and the text data 122b and inputs the thickness of the myocardium at the location indicated by the numerical data 122a. The heart shape data generation unit 140 corrects the thickness of the corresponding location in the heart model 33 in accordance with the value of the thickness of the myocardium at the location indicated by the numerical data 122a. As one example, the heart shape data generation unit 140 adjusts the distance between the left ventricular endocardium 33c and the left ventricular epicardium 33b so that the thickness of the myocardium on the septum side of the left ventricle becomes equal to the interventricular septum thickness. The heart shape data generation unit 140 also adjusts the distance between the left ventricular endocardium 33c and the left ventricular epicardium 33b so that the thickness of the myocardium on the left ventricle posterior wall side becomes equal to the diastolic left ventricle posterior wall thickness.

When the text data 122b states that the thickness of the myocardium has thinned, the user checks the text data 122b and inputs the location that has thinned. The heart shape data generation unit 140 corrects the shape of the heart model 33 so that the thickness of the myocardium at the location where thinning has been indicated is thinner than the other parts by a certain ratio. In the example in FIG. 10, since the text data 122b indicates thinning of the septum, the heart shape data generation unit 140 adjusts the thickness of the septum.

By doing so, the heart shape data 141 indicating the patient's heart shape with high accuracy is generated.

Landmark Setting Process

Next, the landmark setting process will be described in detail. When the heart shape data 141 has been generated, the landmark setting process is performed by the heart shape data generation unit 140.

Figure 11:
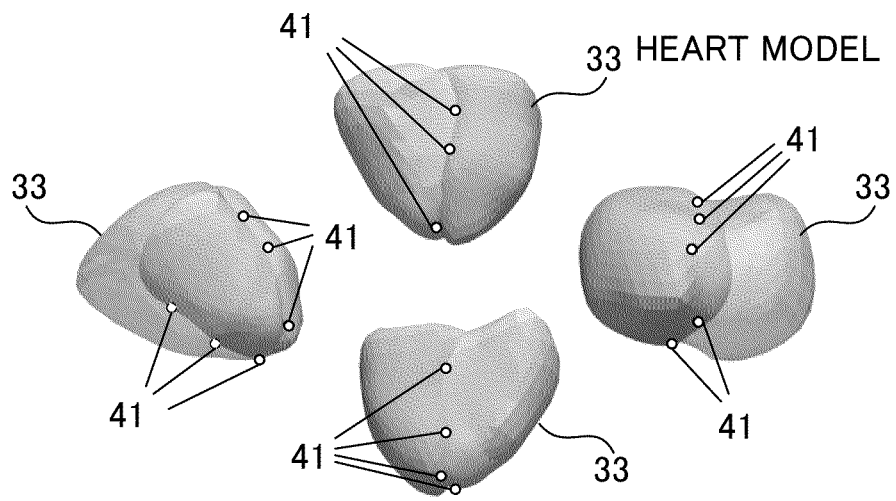
FIG. 11 depicts one example of a landmark setting process.
Figure 11:
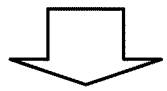
Figure 11:
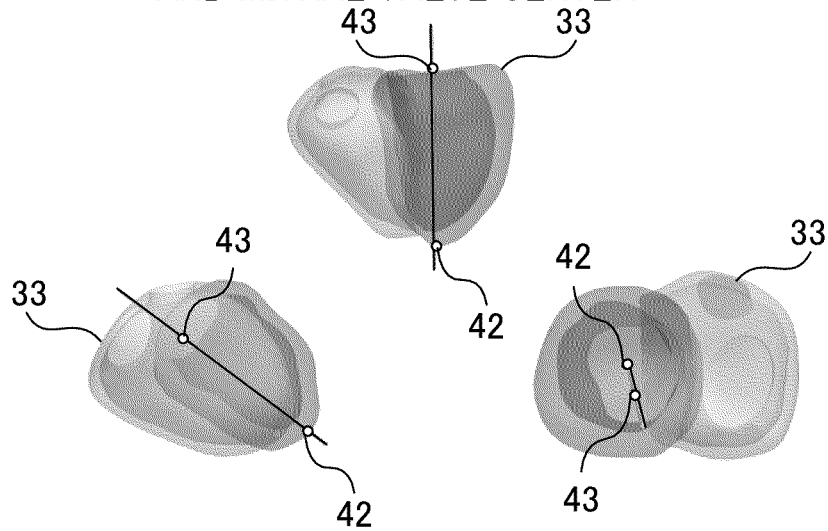

FIG. 11 depicts one example of the landmark setting process. As one example, the heart shape data generation unit 140 displays the heart model 33 on the monitor 21. The heart shape data generation unit 140 rotates the heart model 33 in a virtual three-dimensional space in keeping with operations by the user, and displays the heart model 33 on the monitor 21 when viewed from a direction designated by the user.

The user operates the mouse 23 or the like to set a plurality of landmarks 41 at the positions of the anterior interventricular sulcus and the posterior interventricular sulcus in the heart model 33. The user also sets landmarks 42 and 43 at predetermined characteristic positions, such as the cardiac apex and the mitral valve center. The heart shape data generation unit 140 adds information indicating the positions of the landmarks that have been set to the heart shape data 141.

Figure 12:
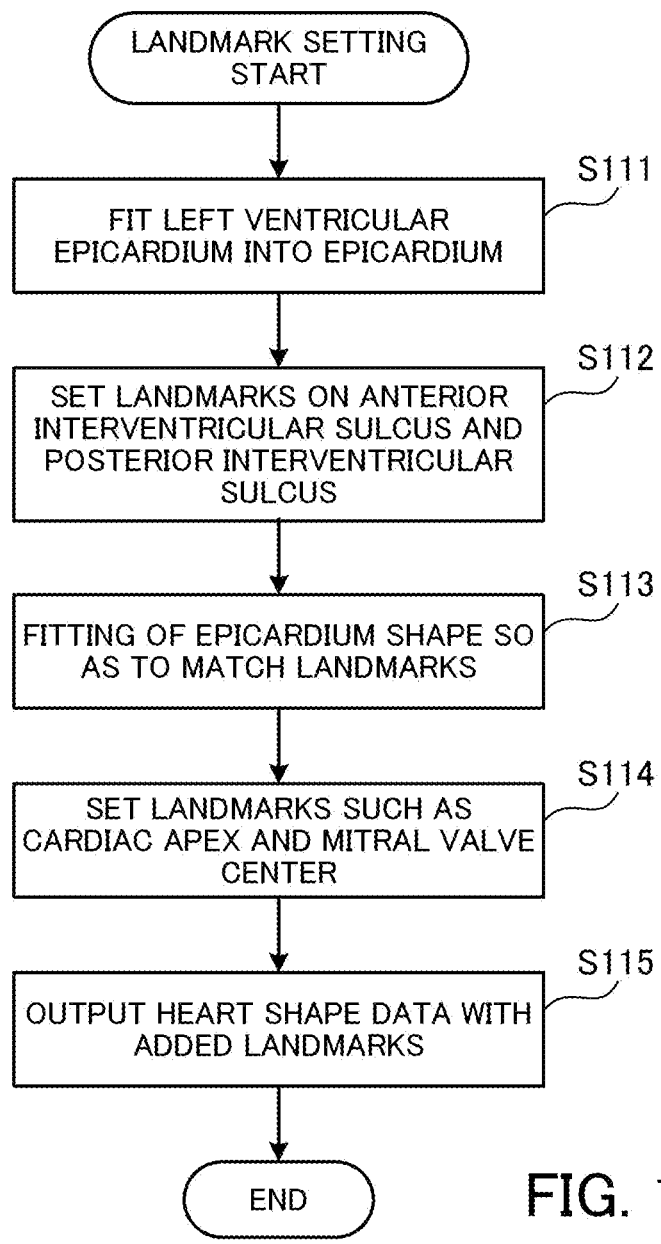
FIG. 12 is a flowchart depicting an example procedure of the landmark setting process.

FIG. 12 is a flowchart depicting an example procedure of the landmark setting process. The processing depicted in FIG. 12 will now be described in order of the step numbers.

[Step S111] The heart shape data generation unit 140 fits the left ventricular epicardium into the epicardium. As one example, when the position of the left ventricular epicardium and the position of the epicardium are displaced in a region where the left ventricular epicardium and the epicardium are supposed to coincide, the heart shape data generation unit 140 corrects the position of the left ventricular epicardium to the position of the epicardium. A region where the left ventricular epicardium and the epicardium are supposed to coincide is, for example, a region out of the left ventricle side of the heart where the difference between the curved surface indicating the left ventricular epicardium and the curved surface indicating the epicardium is equal or less than a predetermined value.

[Step S112] The heart shape data generation unit 140 sets landmarks indicating the anterior interventricular sulcus and the posterior interventricular sulcus on the left ventricular epicardium based on an operation by the user. As one example, the heart shape data generation unit 140 displays the heart model 33 on the monitor 21 based on the heart shape data 141. The user visually checks the shape of the displayed heart model 33 and designates the positions of the anterior interventricular sulcus and the posterior interventricular sulcus on the heart model 33 using the mouse 23. The heart shape data generation unit 140 sets a plurality of landmarks 41 at the designated positions.

[Step S113] The heart shape data generation unit 140 performs fitting by enlarging or reducing the shape of the epicardium so as to match the plurality of landmarks 41 that have been set. As one example, the heart shape data generation unit 140 corrects the shape of the epicardium so that the left ventricular epicardium and the epicardium coincide in a region on the left ventricle side, with a curve that smoothly connects the plurality of landmarks 41 as a boundary. The heart shape data generation unit 140 also corrects the shape of the epicardium so as to not overlap the left ventricular epicardium in a region on the right ventricle side, with the curve that smoothly connects the plurality of landmarks 41 as a boundary.

[Step S114] The heart shape data generation unit 140 sets landmarks such as the cardiac apex and the mitral valve center. As one example, the heart shape data generation unit 140 displays the heart model 33 on the monitor 21 based on the heart shape data 141. The user visually checks the shape of the displayed heart model 33 and designates predetermined characteristic positions, such as the cardiac apex and the mitral valve center, on the heart model 33 using the mouse 23. The heart shape data generation unit 140 then sets landmarks at the designated positions.

[Step S115] The heart shape data generation unit 140 outputs the heart shape data 141 to which landmark position information has been added.

By doing so, correction of the heart shape data 141 using a plurality of landmarks 41 indicating the anterior interventricular sulcus and the posterior interventricular sulcus, and specifying of the positions of the cardiac apex and the mitral valve center by way of the landmarks 42 and 43 are performed.

Figure 13:
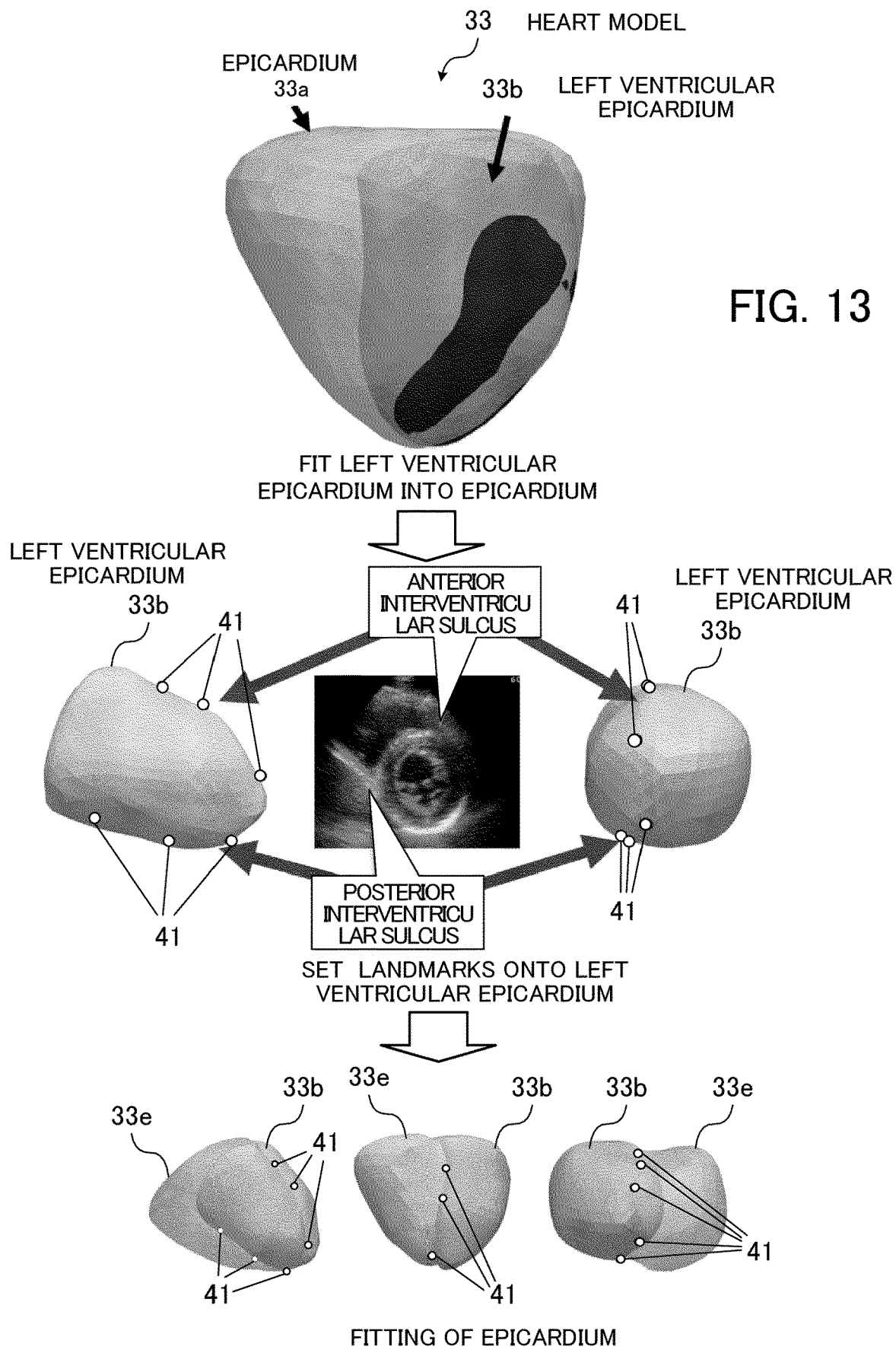
FIG. 13 depicts one example setting of landmarks for an anterior interventricular sulcus and a posterior interventricular sulcus.

FIG. 13 depicts one example setting of landmarks for the anterior interventricular sulcus and the posterior interventricular sulcus. As one example, by fitting the left ventricular epicardium onto the epicardium in the heart model 33, the part (that is, the "epicardium 33e") of the epicardium 33a that does not overlap the left ventricular epicardium 33b is extracted. When the plurality of landmarks 41 indicating the anterior interventricular sulcus and the posterior interventricular sulcus have been set, the heart shape data generation unit 140 corrects the epicardium 33e so that the boundary between the left ventricular epicardium 33b and the epicardium 33e is the position of the anterior interventricular sulcus and the posterior interventricular sulcus.

In this way, the shape of the patient's heart is accurately represented by the heart model 33. A region between the left ventricular epicardium 33b and the left ventricular endocardium 33c in the heart model 33 is the left ventricular muscle. A region inside the left ventricular endocardium 33c is the left ventricular blood pool. Out of a region extending inward from the epicardium 33e with the thickness of the myocardium, the region aside from the left ventricular muscle is the right ventricular muscle. A region inside the right ventricular muscle is the right ventricular blood pool. That is, the left ventricular muscle, the left ventricular blood pool, the right ventricular muscle, and the right ventricular blood pool are clearly established in the heart model 33.

After the shape of the heart model 33 has been corrected in keeping with the landmarks, landmarks are set at characteristic predetermined positions of the heart.

Figure 14:
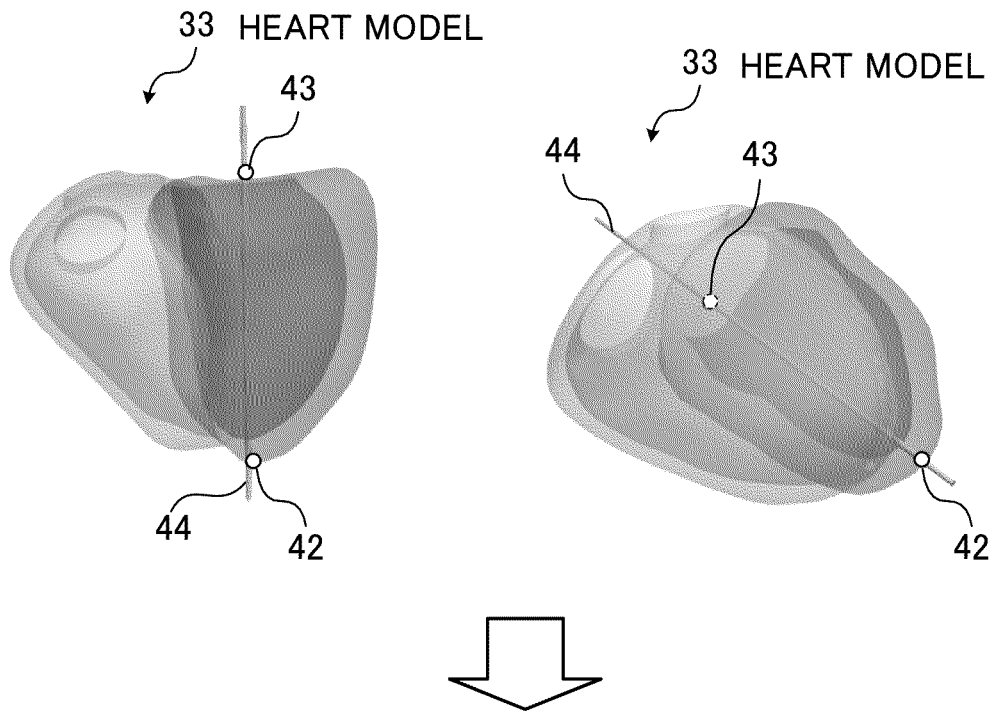
FIG. 14 depicts an example of characteristic positions of the heart to be set as landmarks.
Figure 14:
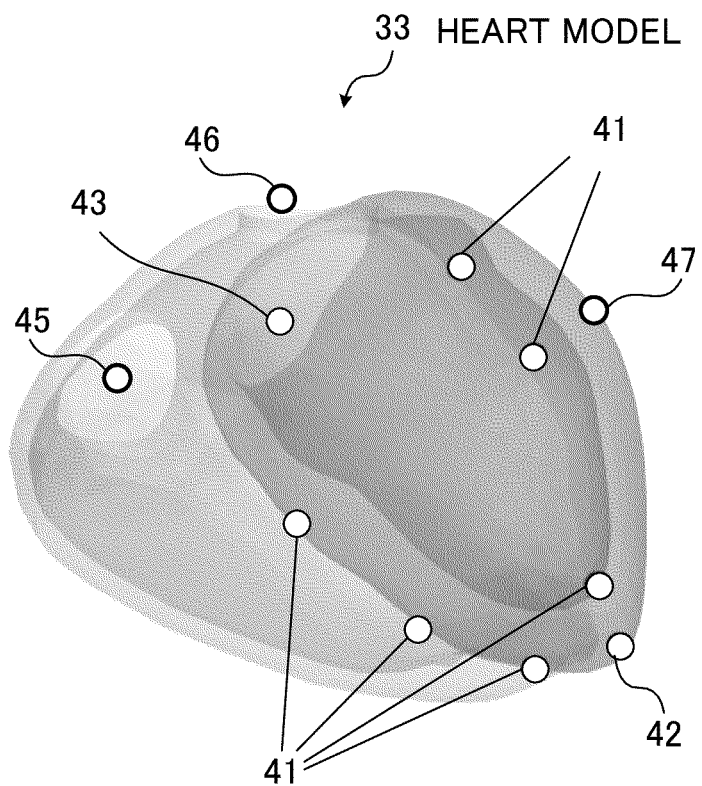

FIG. 14 depicts an example of characteristic positions of the heart to be set as landmarks. As examples of landmarks indicating characteristic positions of the heart, the heart shape data generation unit 140 sets a landmark 42 indicating the position of the cardiac apex and a landmark 43 indicating the position of the mitral valve center. A straight line indicating the positions of these landmarks 42 and 43 is a cardiac axis 44 of the heart model 33.

As an example, the heart shape data generation unit 140 also sets a landmark 45 indicating the position of the septum and the annulus (the tricuspid valve) on the anterior surface of the heart. The heart shape data generation unit 140 sets a landmark 46 indicating the position of the septum and annulus (the pulmonary valve) on the posterior surface of the heart. In addition, the heart shape data generation unit 140 sets three landmarks 41 for each of the posterior interventricular sulcus and the anterior interventricular sulcus at positions of the septum from the cardiac apex toward the annulus, sets a landmark 42 at the cardiac apex, and sets a landmark 43 at a center position of the mitral valve. These landmarks 41, 42, and 43 are used to define a rotational axis for rotating the heart model 33. In addition, the landmarks 45 and 46 may set a landmark 47 indicating the position of a center part of a free wall of the left ventricular epicardium. By setting the landmark 45 for the tricuspid valve and the landmark 46 of for pulmonary valve, the four blood valves (that is, the aortic valve, the mitral valve, the tricuspid valve, and the pulmonary valve) in the heart are positioned at appropriate positions in the heart model 33.

Information indicating the positions of the landmarks 41 to 43 and 45 to 47 is added to the heart shape data 141. Note that when the effect of implanting a CRT apparatus is verified through a biological simulation, landmarks indicating the electrode positions of the CRT apparatus may be set on the heart model 33. The heart shape data 141 including landmark position information is transmitted to the computational grid data generation unit 160.

Thorax Shape Data Generation Process

Next, the thorax shape data generation process will be described in detail. The thorax shape data generation unit 150 executes the thorax shape data generation process in parallel with the generation of the heart shape data by the heart shape data generation unit 140.

Figure 15:
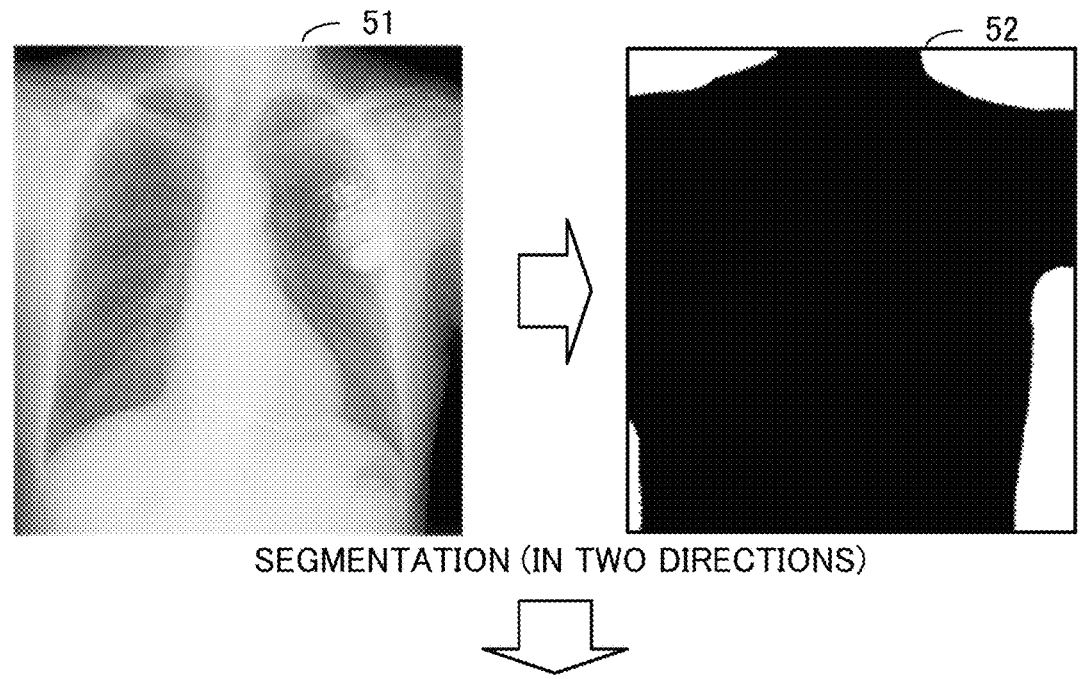
FIG. 15 depicts an overview of a thorax shape data generation process.
Figure 15:
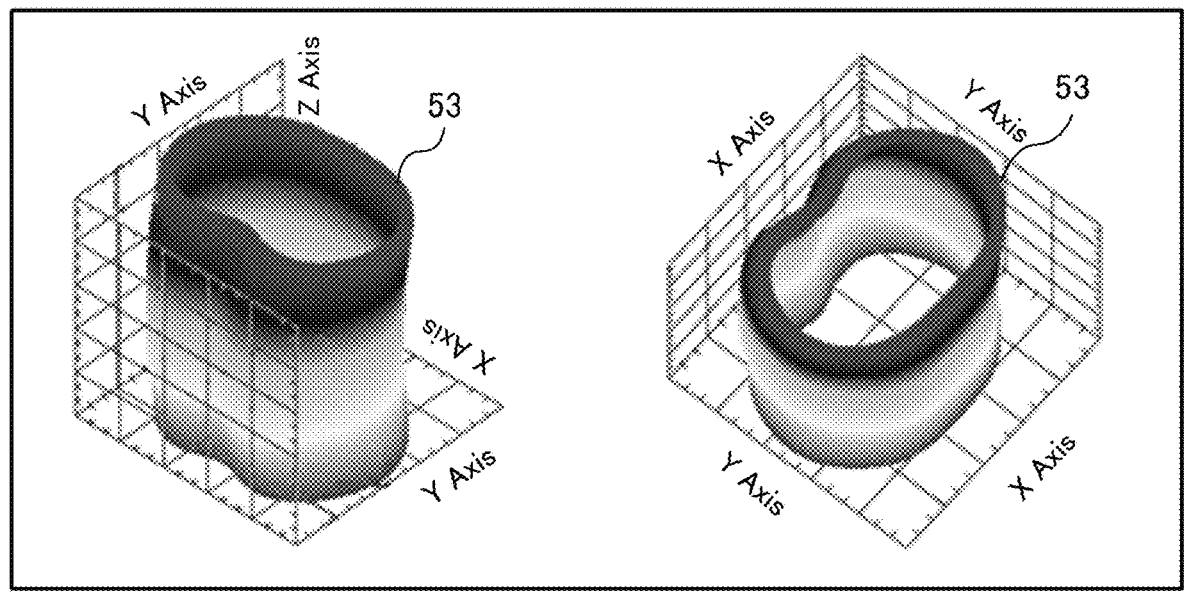

FIG. 15 depicts an overview of the thorax shape data generation process. The thorax shape data generation unit 150 performs segmentation of the thorax shape from the X-ray image 51. This segmentation generates a binarized image 52 in which the thorax shape is black and other parts are white, for example. FIG. 15 depicts an example of segmentation of an X-ray image 51 of a patient who has been x-rayed from the front. The thorax shape data generation unit 150 performs segmentation in the same way on an X-ray image of the patient taken in the width direction.

The thorax shape data generation unit 150 calculates a boundary point group 53 indicating the boundary between the thorax and the outside world based on the binarized image 52 obtained by segmentation. The thorax shape data generation unit 150 then outputs data indicating positional coordinates of each point in the boundary point group as the thorax shape data 151.

Figure 16:
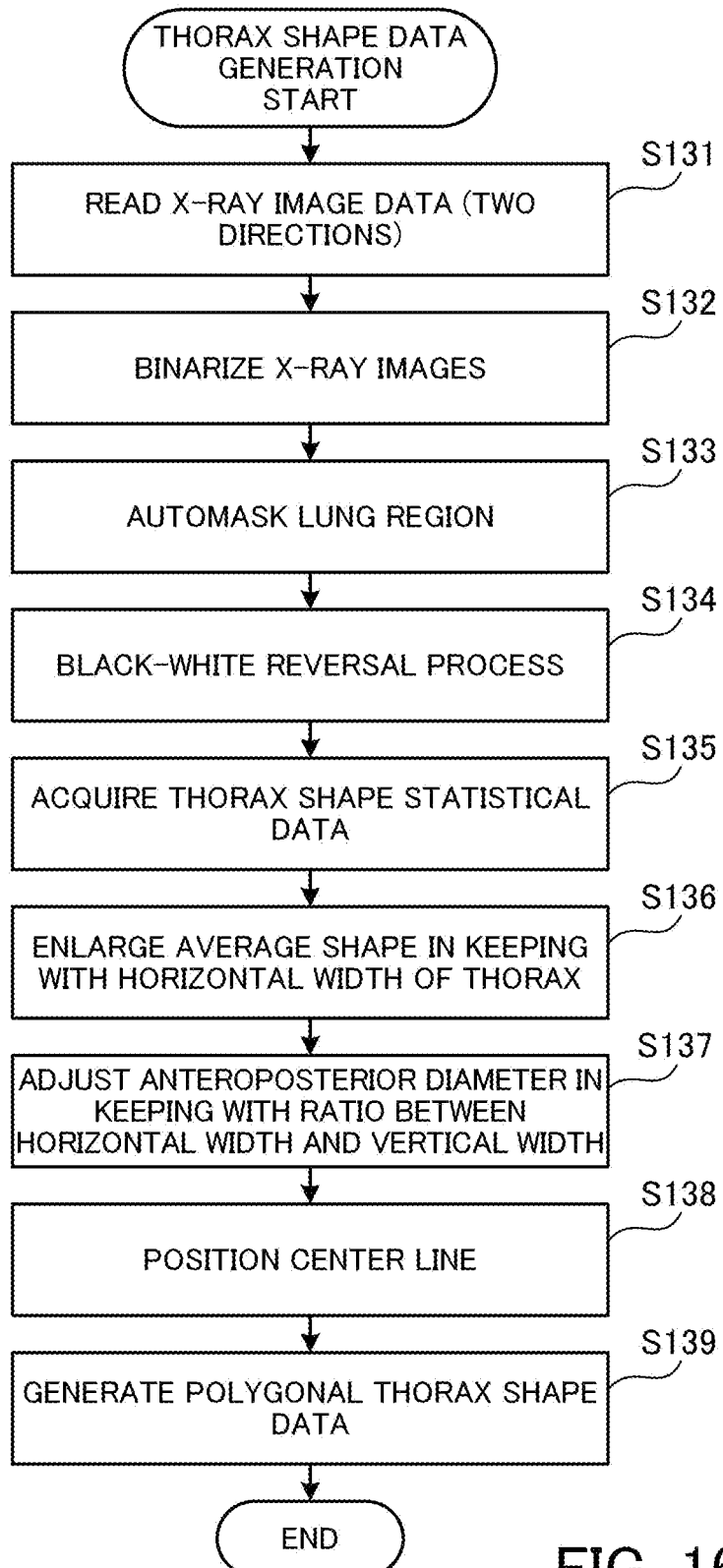
FIG. 16 is a flowchart depicting an example procedure of the thorax shape data generation process.

FIG. 16 is a flowchart depicting an example procedure of the thorax shape data generation process. The processing depicted in FIG. 16 will now be described in order of the step numbers.

[Step S131] The thorax shape data generation unit 150 reads the X-ray image data 123 indicating X-ray images produced by X-raying the patient in two directions from the storage unit 120.

[Step S132] The thorax shape data generation unit 150 binarizes the X-ray images indicated by the X-ray image data 123. This binarization converts the background space to black and the human body to white except for the lung region. A black image of the lungs appears in the lung region within the human body.

[Step S133] The thorax shape data generation unit 150 performs an automasking process on the lung region. This automasking process fills the lung region with the same color (white) as the surrounding region.

[Step S134] The thorax shape data generation unit 150 performs a black-and-white reversal process on the binarized image.

[Step S135] The thorax shape data generation unit 150 acquires the thorax shape statistical data 311 from the human body information server 300.

[Step S136] The thorax shape data generation unit 150 enlarges or reduces the average shape of the thorax indicated in the thorax shape statistical data 311 according to the horizontal width of the thorax of the patient. As one example, the thorax shape data generation unit 150 determines the parameters of a function that calculates the shape of cross-sections of the thorax based on the thorax shape statistical data 311 with the width of the thorax as a variable. The thorax shape data generation unit 150 then sets a value equal to half the horizontal width of the patient's thorax into the variable of the function indicating the shape of thorax cross-sections to obtain a thorax cross-sectional shape that has been enlarged or reduced in keeping with the horizontal width of the patient's thorax. By calculating a plurality of such thorax cross-sectional shapes at different height positions of the patient's thorax, cross-sectional shapes of the thorax at each height are obtained.

[Step S137] The thorax shape data generation unit 150 adjusts the anteroposterior diameter of the thorax shape obtained in step S136 according to the ratio of the horizontal width to the vertical width of the patient's thorax. The horizontal width of the patient's thorax is obtained from an image produced by binarizing an X-ray image from the front. The vertical width of the patient's thorax is obtained from an image produced by binarizing an X-ray image from the side.

[Step S138] The thorax shape data generation unit 150 finds a center line of the thorax based on an X-ray image from the side, and aligns the respective center positions of the cross-sectional shapes of the thorax calculated for each height of the thorax with this center line of the thorax. By doing so, the thorax shape of the patient is obtained. This thorax shape is expressed by a group of points on the thorax surface, for example.

[Step S139] The thorax shape data generation unit 150 generates the polygonal thorax shape data 151 based on the generated point group.

By doing so, the thorax shape data 151 is generated.

Figure 17:
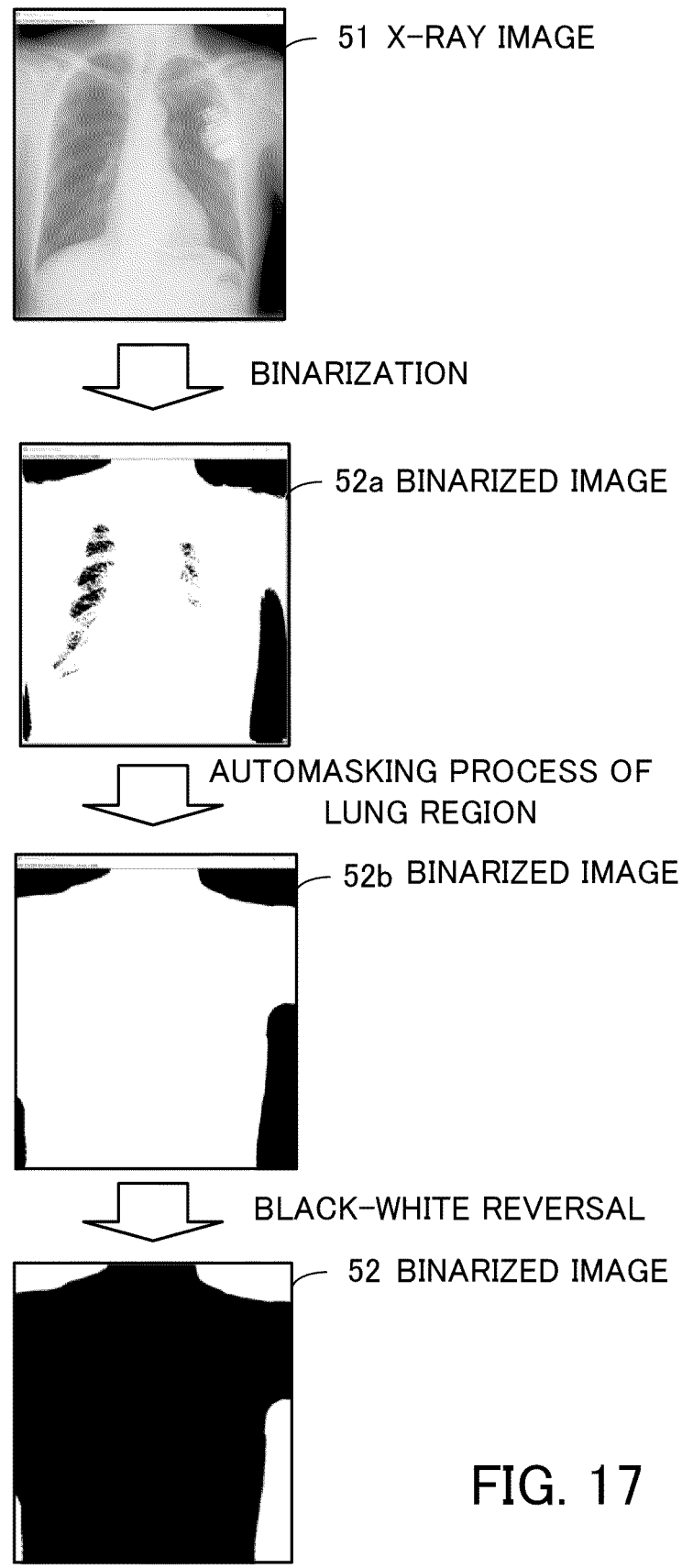
FIG. 17 depicts one example of segmentation of a thorax region.

FIG. 17 depicts one example of segmentation of the thorax region. By binarizing the X-ray image 51, pixels whose luminance is equal to or greater than a predetermined value are converted to white, and pixels whose luminance is less than the predetermined value are converted to black. As a result, a binarized image 52a is generated. The binarized image 52a at this stage is still black in the lung region. By converting the lung region to white via an automasking process, a binarized image 52b is generated in which the inside of the human body is white and other parts are black. By inverting white and black in this binarized image 52b, a binarized image 52 like that depicted in FIG. 15 is obtained.

The segmentation depicted in FIG. 17 is also performed on an X-ray image of the patient taken in the width direction. The thorax shape data generation unit 150 calculates the horizontal width of the patient's thorax based on the binarized image 52 when looking from the front. The thorax shape data generation unit 150 also calculates the width of the patient's thorax in the anteroposterior direction based on the binarized image from the width direction.

The thorax shape data generation unit 150 obtains the average thorax shape of the human body based on the thorax shape statistical data 311 and corrects the thorax shape to generate the thorax shape of the patient.

Figure 18:
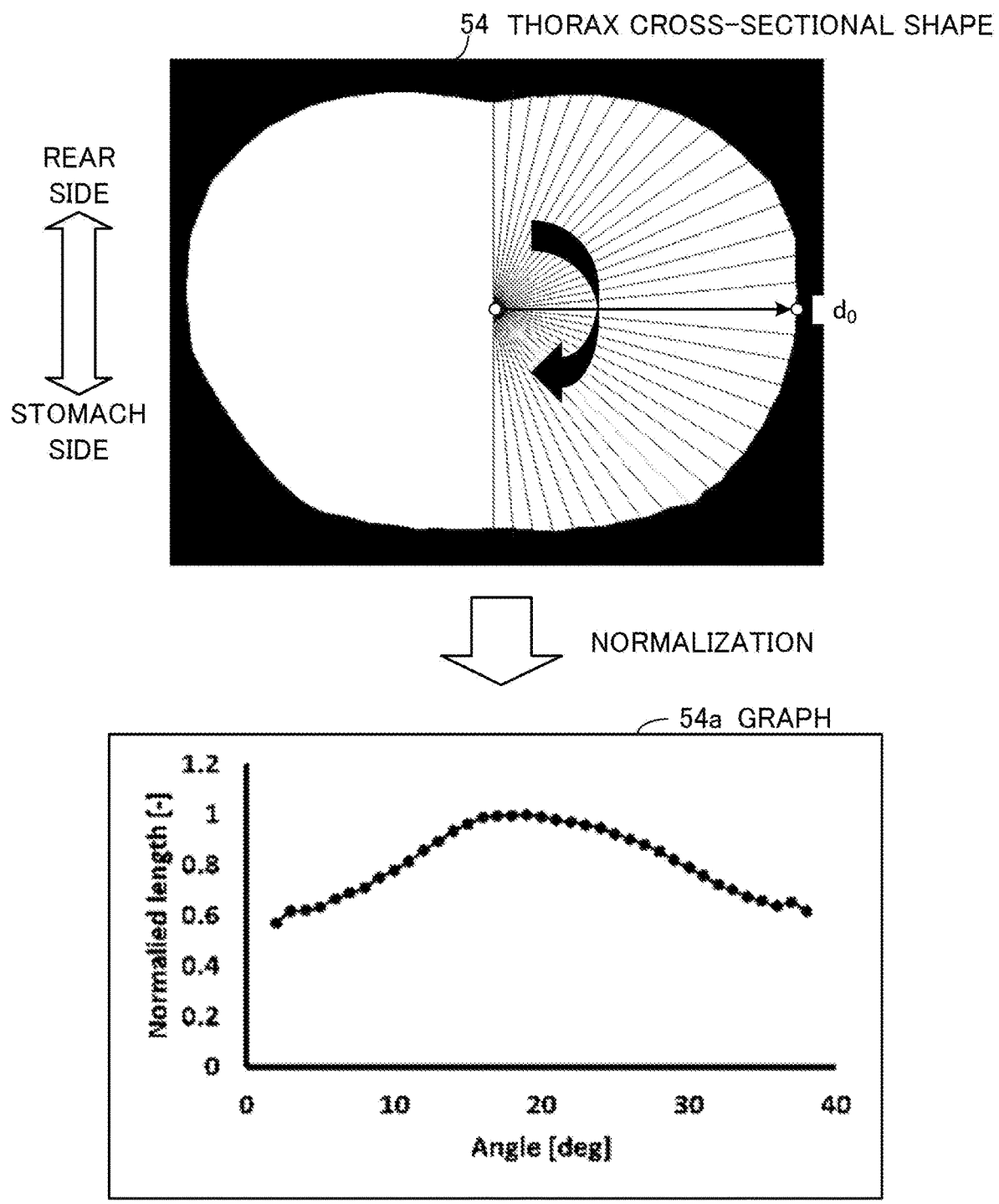
FIG. 18 depicts one example method for indicating the thorax shape.

FIG. 18 depicts one example method for indicating the thorax shape. As one example, it is assumed that a thorax cross-sectional shape 54 is present at a predetermined position on the human body. Here, consider polar coordinates that have the center of the thorax cross-sectional shape 54 as the origin. When radial lines have been drawn from the origin at intervals of a predetermined angle, it is possible to find intersections between the circumference of the thorax and each radial line. The coordinates at the position of an intersection are represented by an angle and a distance from the origin. A set of coordinates of the positions of the respective intersections represents the thorax shape of one individual human body.

The thorax shape data is normalized to absorb the differences in data due to differences in physique when the thorax shapes of a plurality of people are compared. As one example, normalization is performed so that the maximum value of the distance from the center of the thorax is "1". Normalized thorax shape data is indicated in a graph 54a. In the graph 54a, the horizontal axis represents the angle and the vertical axis represents the distance from the origin after normalization.

Let d0 be the distance from the origin to a point of intersection (or "initial position") between a radial line extending horizontally from the center of the thorax shape and the outer circumference of the thorax. The distance $l_i$ from the origin to the intersection of a radial line of the $i^{th}$ angle and the outer circumference of the thorax may be expressed as "$l_i = \alpha_i \cdot d_0$" using the parameter $\alpha i$. The parameter $\alpha_i$ for each angle may be decided based on the average thorax shape indicated in the thorax shape statistical data 311, for example. This average thorax shape may be acquired from the thorax shape statistical data 311.

Figure 19:
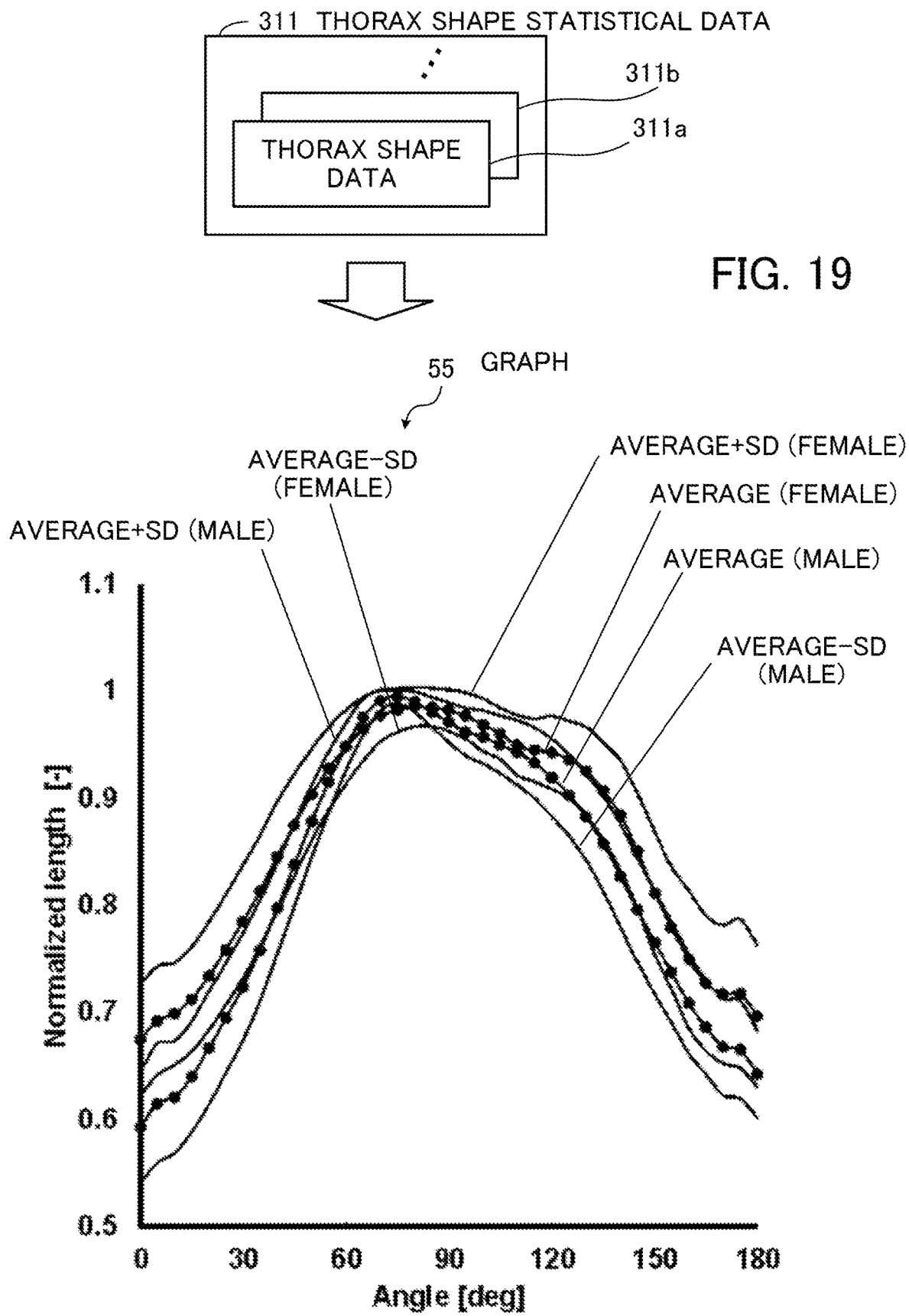
FIG. 19 depicts an example of statistical information that may be acquired from thorax shape statistical data.

FIG. 19 depicts an example of statistical information that may be acquired from the thorax shape statistical data. As one example, the thorax shape statistical data 311 includes thorax shape data 311a, 311b, . . . of a plurality of people. As examples, the thorax shape data 311a, 311b, . . . includes the gender of a person being measured and the measurement results of the thorax shape at predetermined measurement locations. One example of a measurement location is an underbust position.

The thorax shape data generation unit 150 classifies the thorax shape data 311a, 311b, . . . included in the thorax shape statistical data 311 by gender, and calculates male statistical information and female statistical information. As examples, the thorax shape data generation unit 150 calculates the average of the normalized length from the center of the thorax to the circumference of the thorax for each angle, the average plus the standard deviation (SD), the average minus the SD, and the like.

A graph 55 in FIG. 19 depicts statistical information obtained from the thorax shape statistical data 311. The horizontal axis of the graph 55 represents the angle and the vertical axis represents the normalized length. Out of the statistical information depicted in FIG. 19, for example, the thorax shape data generation unit 150 uses information indicating the male average and information indicating the female average to generate the thorax shape data 151 of the patient who is the subject.

Figure 20:
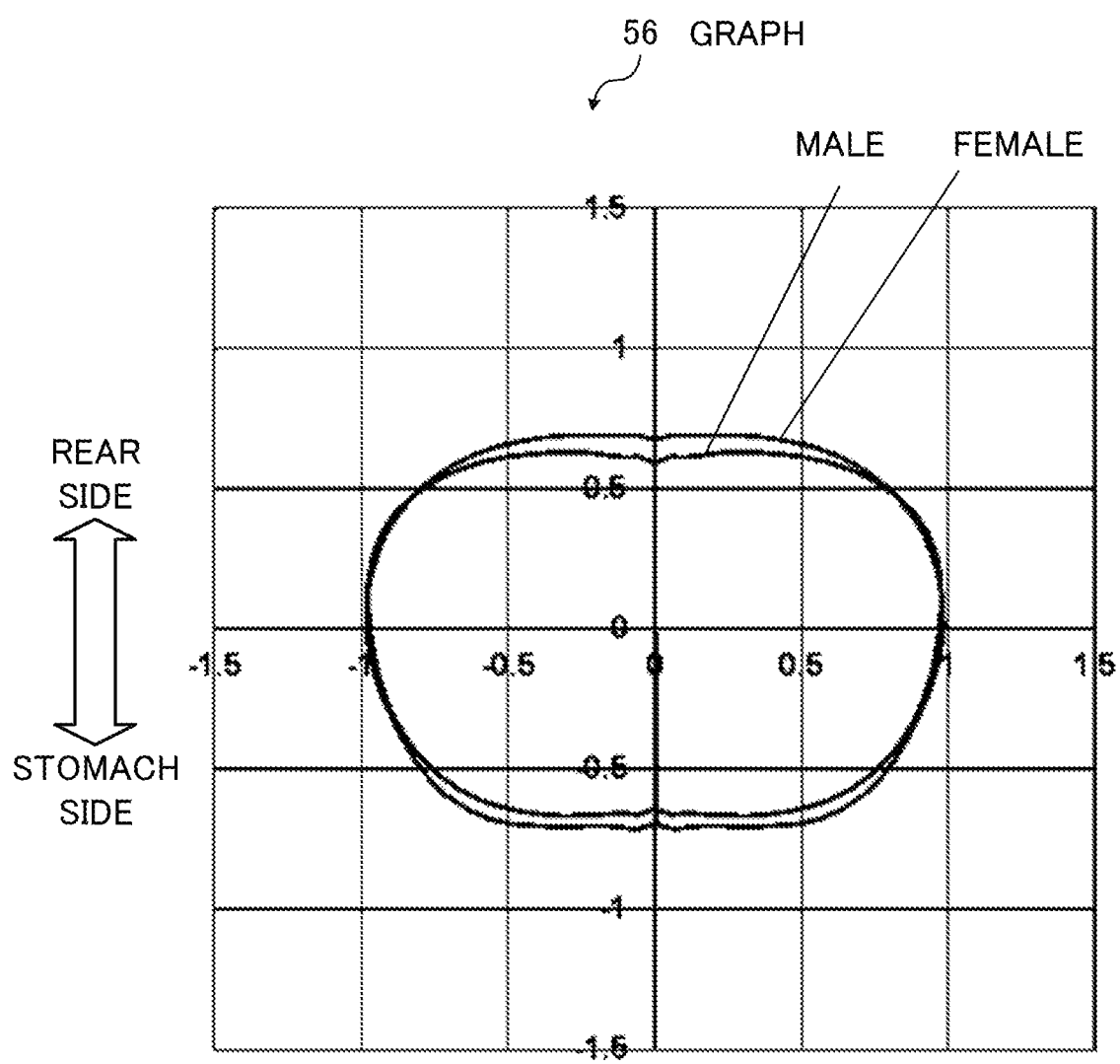
FIG. 20 depicts examples of an average shape of the thorax.

FIG. 20 depicts examples of the average shape of the thorax. In the graph 56 depicted in FIG. 20, the horizontal axis represents positions in the lateral direction on the outer circumference of the thorax, and the vertical axis represents positions in the anteroposterior direction on the outer circumference of the thorax. As depicted in the graph 56, an average shape of the thorax that has been normalized is obtained for males and females, respectively, based on the thorax shape statistical data 311.

The thorax shape data generation unit 150 uses the relationship "$l_i = \alpha_i \cdot d_0$" to calculate the value of the parameter $\alpha_i$ for each angle based on the average value of the distance $l_i$ for each angle. By using the value of the parameter $\alpha_i$ for each angle, the thorax shape data generation unit 150 generates a thorax shape that is similar to the average thorax in keeping with the horizontal width of the thorax.

Figure 21:
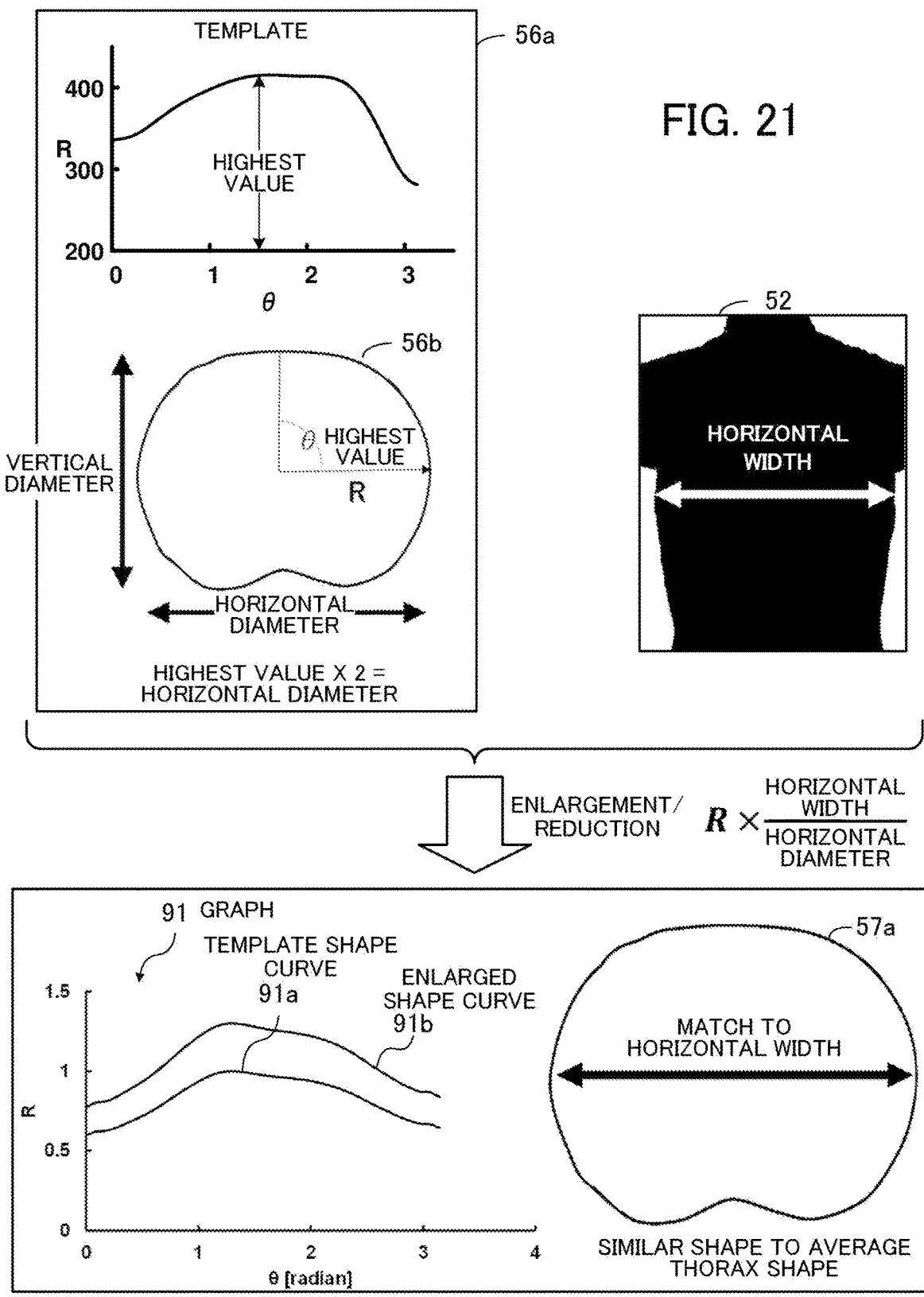
FIG. 21 depicts one example of thorax shape generation in keeping with a horizontal width of the thorax of the subject.

FIG. 21 depicts one example of thorax shape generation in keeping with the horizontal width of the thorax of the subject. As one example, a template 56a indicating an average thorax shape 56b obtained based on the thorax shape statistical data 311 is generated. The template 56a indicates a distance R from the center of the average thorax shape 56b to the thorax surface for each angle. The distance R from the center of the average thorax shape 56b to the thorax surface in the horizontal direction is the maximum value of the distance R. A value that is double the maximum value of the distance R is the horizontal diameter of the average thorax shape 56b.

Based on the binarized image 52, the thorax shape data generation unit 150 finds the horizontal width of the patient's thorax. The thorax shape data generation unit 150 then calculates a similar thorax shape 57a produced by enlarging or reducing the average thorax shape based on the horizontal diameter of the average thorax shape, and the horizontal width of the thorax of the subject obtained from the binarized image 52 of the X-ray image taken from the front. As one example, the thorax shape data generation unit 150 multiplies the distance R at each angle indicated in the template 56a by the ratio of the horizontal width to the horizontal diameter (horizontal width/horizontal diameter). By doing so, a thorax shape 57a that is similar to the average thorax shape is obtained.

A graph 91 indicates the change in the distance R to the thorax shape surface for each angle before and after enlargement when the ratio between the horizontal width and the horizontal diameter is 1.3, for example. The horizontal axis of the graph 91 represents the angle θ, and the vertical axis represents the distance R. As indicated in the graph 91, the curve indicating the thorax shape 57a when enlargement according to the horizontal width of the subject has been performed (that is, the enlarged shape curve 91b) is higher than the curve indicating the average thorax shape 56b (that is, the template shape curve 91a).

The thorax shape 57a is indicated by a group of points along the outer circumference of a cross section of the patient's thorax, for example. A group of points (or "boundary point group") on the outer circumferential surface of the thorax is generated by generating such groups of points at predetermined intervals in the height direction of the patient's thorax.

In addition, the thorax shape data generation unit 150 is able to extract contours of the thorax when looking from the width direction by binarizing an X-ray image from the side. The thorax shape data generation unit 150 corrects the width in the anteroposterior direction of the boundary point group of the thorax based on the contours of the thorax from the width direction, for example.

Figure 22:
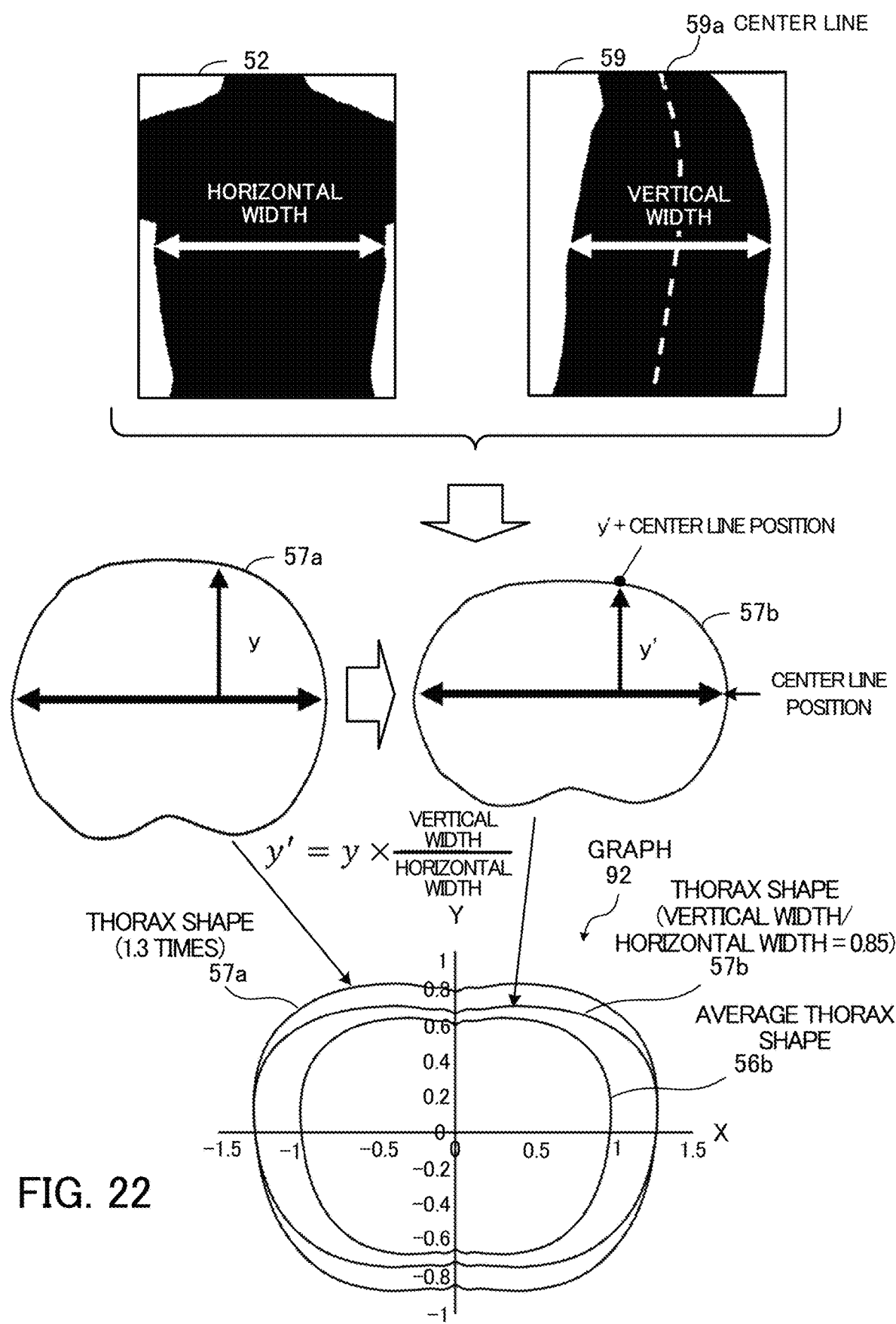
FIG. 22 depicts an example of correction of a thorax shape based on an X-ray image from the side.

FIG. 22 depicts an example of correction of the thorax shape based on an X-ray image from the side. As one example, the thorax shape data generation unit 150 obtains the vertical width and center line 59a of the thorax of the subject based on a binarized image 59 of the X-ray image from the side. The vertical width is measured at a plurality of positions while changing the height of the measurement position, for example. The center line is a curve that passes through a position midway between the anterior and posterior surfaces of the thorax.

The thorax shape data generation unit 150 adjusts the anteroposterior diameter according to the ratio between the horizontal width and the vertical width. As one example, the thorax shape data generation unit 150 sets a distance to each point on the thorax surface from an axis in the width direction that passes through an origin of the thorax shape 57a obtained by enlarging or reducing the average thorax shape in keeping with the horizontal width as y. The thorax shape data generation unit 150 multiplies this distance y to each point on the thorax surface by the value of the ratio (vertical width/horizontal width) between the vertical width and the horizontal width of the subject. The thorax shape data generation unit 150 sets the multiplication result as the distance y' from the center line position to the thorax surface in a thorax shape 57b after correction.

A center line position is a position on the center line 59a detected based on the binarized image 59 of the X-ray image from the side, at the height of the cross section indicated by the thorax shape 57b. The thorax shape data generation unit 150 moves each point on the surface of the thorax shape 57b to a positions y' away from the center line position.

The graph 92 depicts the average thorax shape 56b, the thorax shape 57a after enlargement (by 1.3 times) in keeping with the horizontal width of the subject, and the thorax shape 57b after correction in keeping with the ratio of the vertical width to the horizontal width superimposed on each other. As depicted in the graph 92, the enlarged thorax shape 57a has been enlarged in both the width direction (that is, in the X-axis direction) and in the vertical direction (that is, in the Y-axis) compared to the average thorax shape 56b. The corrected thorax shape 57b has the same horizontal width as the thorax shape 57a, and is the vertical width/horizontal width times smaller than the thorax shape 57a in the vertical direction (in the example in FIG. 22, "0.85" times).

By calculating the thorax shape 57b depicted in FIG. 22 at a plurality of heights while changing the height at which the thorax is to be calculated, it is possible to generate a thorax model that matches the body shape of the patient (for example, the degree of curvature of the thorax). By using not only an X-ray image from the front but also an X-ray image from the side to generate the thorax model, it is possible to correctly reproduce the thorax model in keeping with the size of the thorax of the patient who is the subject and also with a cross-sectional shape where a vertical/horizontal ratio matches the thorax shape of the subject. In addition, by finding the position in a three-dimensional space of the center line position of the thorax shape using the center line 59a based on the X-ray image taken from the side, inclination when the thorax is viewed in the width direction is correctly reproduced in the thorax model.

Figure 23:
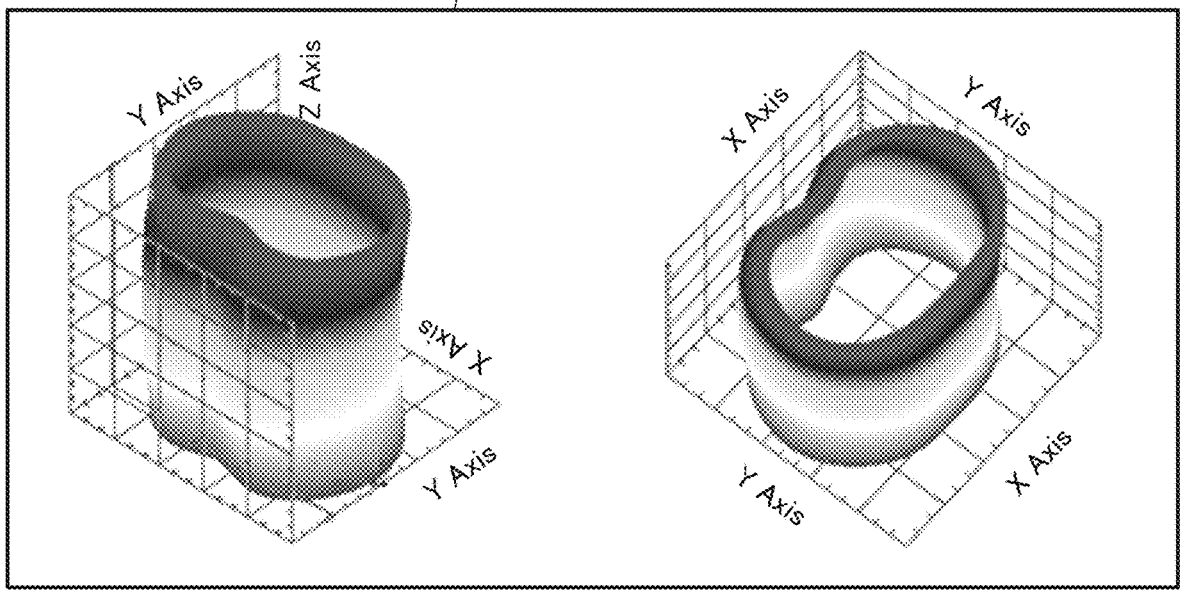
FIG. 23 depicts an example of a boundary point group indicating the thorax shape.
Figure 23:
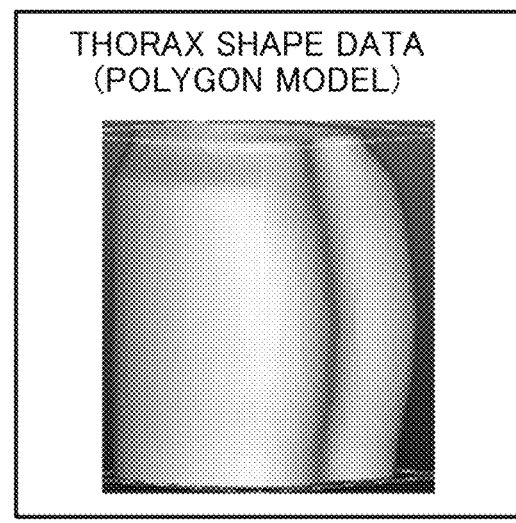

FIG. 23 depicts an example of a boundary point group indicating the thorax shape. As depicted in FIG. 23, this thorax shape appears when the boundary point group 57 is disposed in a three-dimensional space. The thorax shape data generation unit 150 generates the thorax shape data 151 indicating the outer peripheral surface of the thorax using polygons whose vertices are points included in the boundary point group 57, for example. Based on the thorax shape data 151, a polygon model of the thorax is generated in the three-dimensional space.

Electrode Position Setting Process

After generating the thorax shape data 151, the thorax shape data generation unit 150 sets electrode positions for electrocardiogram measurement.

Figure 24:
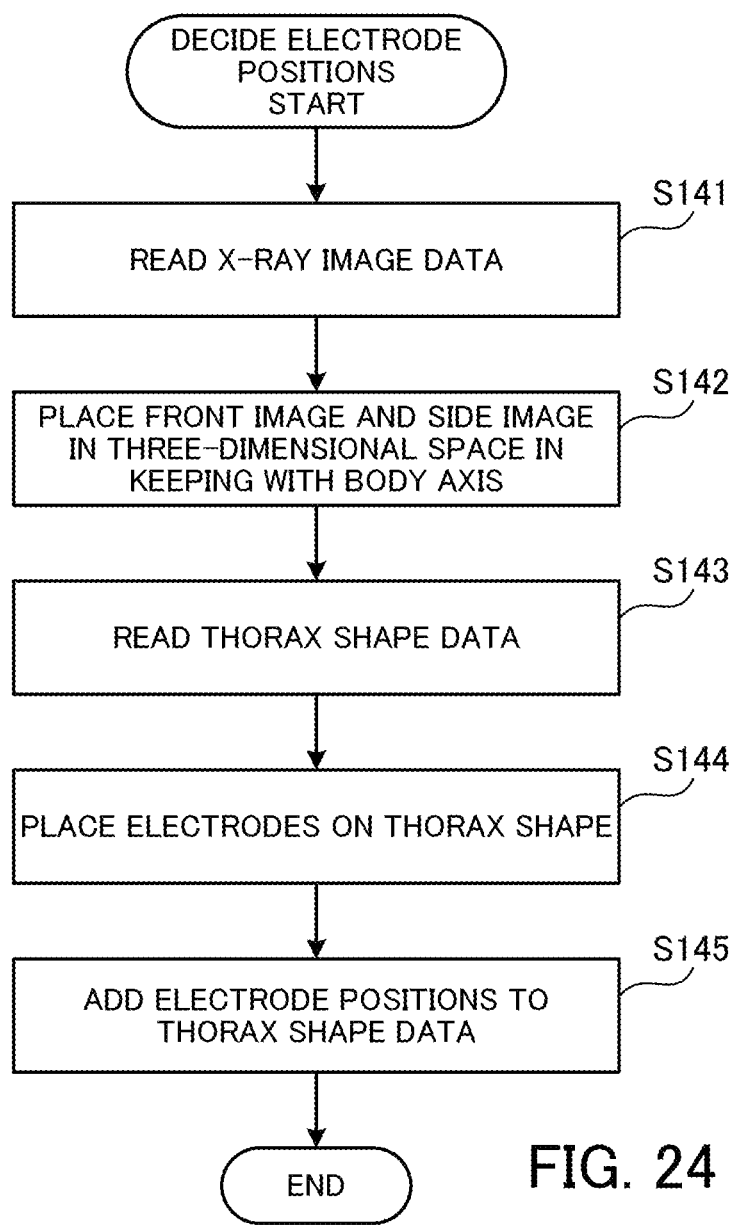
FIG. 24 is a flowchart depicting an example procedure of an electrode position setting process.

FIG. 24 is a flowchart depicting an example procedure of the electrode position setting process. The process depicted in FIG. 24 will now be described in order of the step numbers.

[Step S141] The thorax shape data generation unit 150 reads the X-ray image data 123.

[Step S142] The thorax shape data generation unit 150 places the X-ray image from the front and the X-ray image from the side in the three-dimensional space in accordance with the body axis.

[Step S143] The thorax shape data generation unit 150 reads the thorax shape data 151.

[Step S144] The thorax shape data generation unit 150 displays an X-ray image on the monitor 21 and receives an input designating electrode positions from the user. The thorax shape data generation unit 150 then arranges the electrodes at positions on the thorax shape corresponding to the designated positions.

[Step S145] The thorax shape data generation unit 150 adds the electrode positions to the thorax shape data.

By doing so, the electrode positions are added to the thorax shape data 151.

Figure 25:
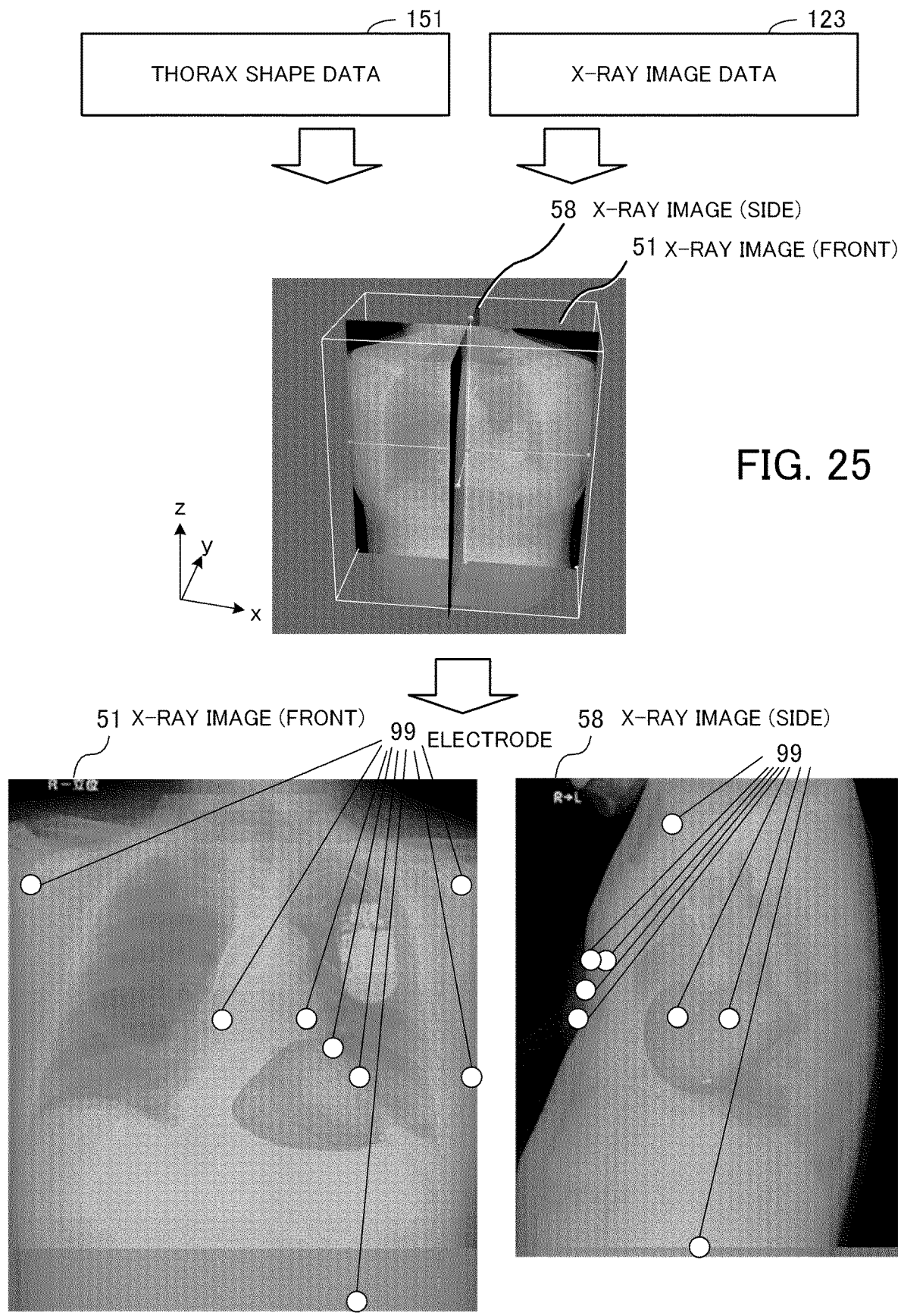
FIG. 25 depicts one example of setting of electrode positions.

FIG. 25 depicts one example of setting the electrode positions. After reading the X-ray image data 123, the thorax shape data generation unit 150 places the X-ray image 51 from the front and the X-ray image 58 from the side in a three-dimensional space. As one example, the X-ray image 51 from the front is placed in parallel to the x-axis with the z-axis as the center. The X-ray image 58 from the side is placed in parallel to the y-axis with the z-axis as the center. In this case, as one example, the two X-ray images 51 and 58 are perpendicular to each other with the x-axis as the line of intersection.

The X-ray image data 123 displays the perpendicular X-ray images 51 and 58 on the monitor 21. The user places a plurality of electrodes 99 for electrocardiogram measurement on the X-ray image 51 or the X-ray image 58. The thorax shape data generation unit 150 decides the respective positions of a plurality of electrodes 99 placed on the thorax based on the thorax shape data 151. As one example, when the positions of the electrodes have been designated on the X-ray image 51 taken from the front, the thorax shape data generation unit 150 sets an intersection between a line that passes through a placed electrode and is parallel to the y-axis and the ventral surface of the thorax shape as the position of that electrode. In addition, when the positions of electrodes have been designated on the X-ray image 58 taken from the side, the thorax shape data generation unit 150 sets an intersection between a line that passes through a placed electrode and is parallel to the x-axis and the surface (that is, the surface in the displayed direction) of the thorax shape as the position of that electrode.

By doing so, the user is able to easily designate the positions of the electrodes. Information indicating the positions of the designated electrodes is added to the thorax shape data 151.

Placement Process of Heart Shape Inside Thorax Shape

When the heart shape data 141 and the thorax shape data 151 have been generated, the computational grid data generation unit 160 places the heart shape inside the thorax shape.

Figure 26:
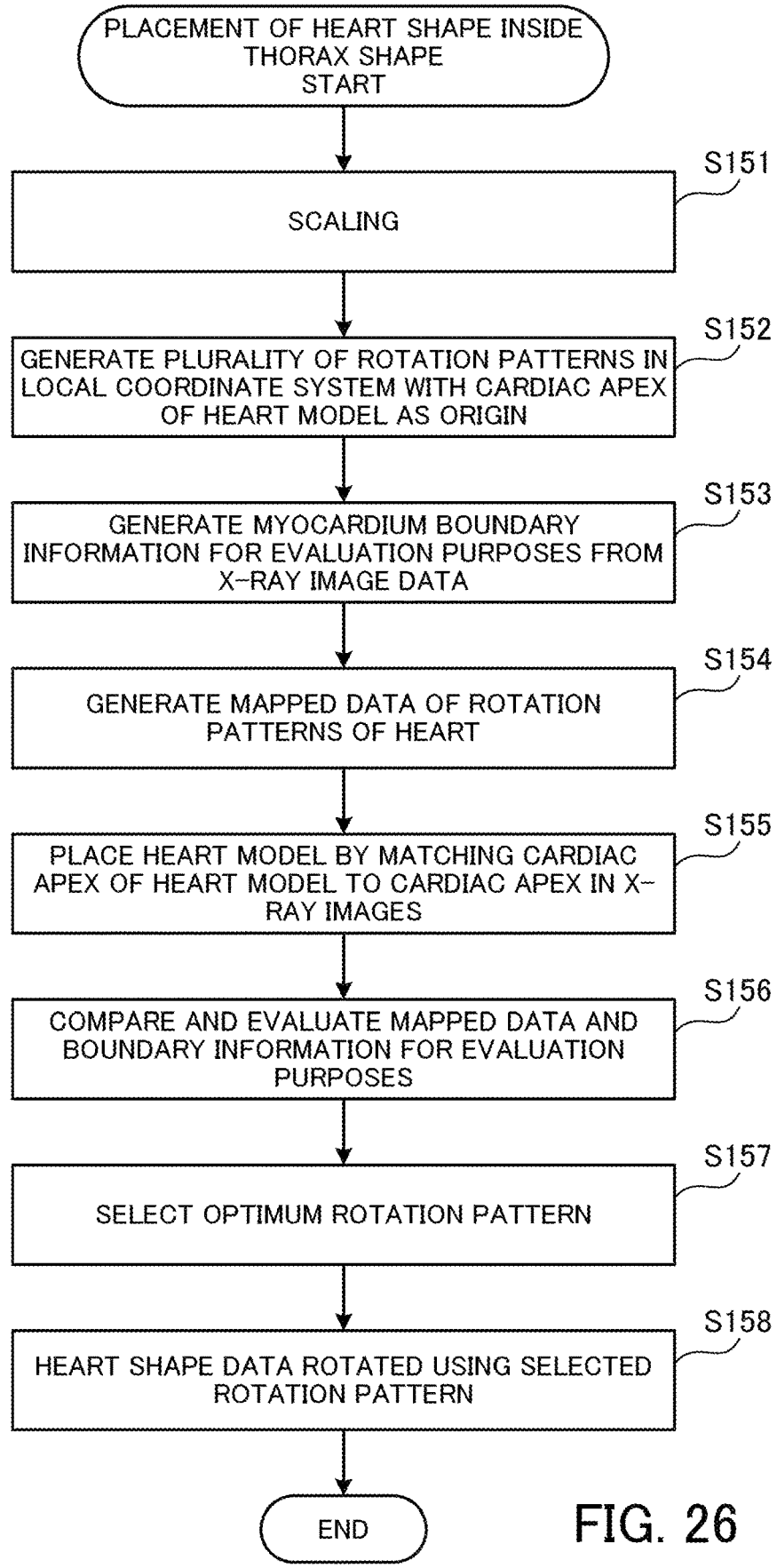
FIG. 26 is a flowchart depicting an example procedure of a process that places a heart shape inside a thorax shape.

FIG. 26 is a flowchart depicting an example procedure of a process that places the heart shape inside the thorax shape. The processing depicted in FIG. 26 will now be described in order of the step numbers.

[Step S151] The computational grid data generation unit 160 scales the heart model 33 indicated by the heart shape data 141. That is, the computational grid data generation unit 160 enlarges or reduces the heart model 33 indicated by the heart shape data 141 so that the size of the heart model 33 matches the size of the heart appearing in the X-ray image 51 from the front. As one example, the computational grid data generation unit 160 performs scaling of the heart model 33 so that the area occupied by the projected image of the heart model 33 from the front is equal to the area occupied by the heart in the X-ray image 51.

[Step S152] The computational grid data generation unit 160 generates 125 rotation patterns for the heart model 33. As one example, the computational grid data generation unit 160 defines a three-axis local coordinate system with the cardiac apex of the heart model 33 as the origin. The computational grid data generation unit 160 then generates a plurality of rotation patterns for rotating the heart model 33 around each axis in the local coordinate system.

[Step S153] The computational grid data generation unit 160 generates myocardium boundary information for evaluation purposes from the X-ray image data. As one example, the computational grid data generation unit 160 sets a closed curve that has been designated by the user as the myocardium boundary on an X-ray image as myocardium boundary information.

[Step S154] The computational grid data generation unit 160 generates mapped data for the plurality of rotation patterns for the heart. As one example, the computational grid data generation unit 160 rotates the heart model 33 in the local coordinate system according to the rotation patterns. Next, the computational grid data generation unit 160 uses a predetermined coordinate transformation matrix to transform the coordinates of the vertices of the heart model 33 from the local coordinate system of the heart model 33 to coordinates in the coordinate system, (or "global coordinate system") in which the thorax shape model is defined. The computational grid data generation unit 160 then parallel-projects (perpendicularly projects) the heart model 33 indicated by coordinates in the global coordinate system onto each of a rear direction projection plane and a width direction projection plane of the thorax shape model. As one example, the computational grid data generation unit 160 uses closed curve information indicating contours of an image obtained by projection as mapped data.

[Step S155] The computational grid data generation unit 160 positions the cardiac apex of the heart model 33 in the global coordinate system in keeping with the cardiac apex of the heart appearing in the X-ray images. As one example, as depicted in FIG. 25, the computational grid data generation unit 160 places the X-ray images 51 and 58 in the virtual space at the same positions as when the thorax shape data was generated. The computational grid data generation unit 160 then places the heart model 33 so that an image of the cardiac apex when the cardiac apex of the heart model 33 is projected onto the X-ray image 51 and the X-ray image 58 is at a position coinciding with the cardiac apex appearing in the X-ray image 51 and the X-ray image 58.

[Step S156] The computational grid data generation unit 160 compares the mapped data and evaluation boundary information for each rotation pattern to evaluate the rotation patterns.

[Step S157] The computational grid data generation unit 160 selects an optimum rotation pattern.

[Step S158] The computational grid data generation unit 160 outputs the heart shape data 141 indicating the heart model 33 after rotation according to the selected rotation pattern. Note that the landmarks assigned to the heart model 33 are also rotated according to the selected rotation pattern, and the positions of the landmarks after the rotation are assigned to the heart shape data 141.

The process that places the heart shape inside the thorax shape will now be described in detail with reference to FIGS. 27 to 29.

Figure 27:
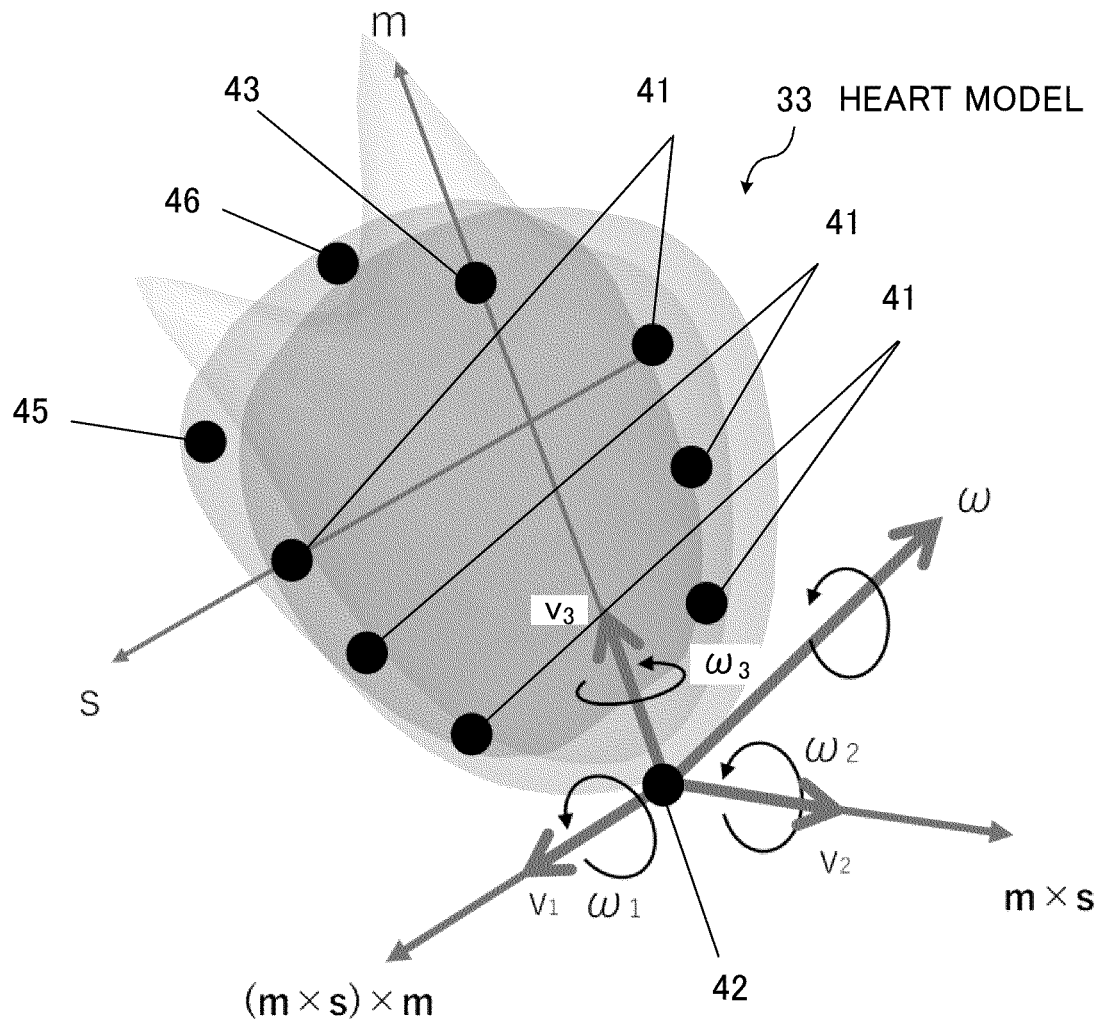
FIG. 27 depicts one example of a rotation pattern generation method.
Figure 27:
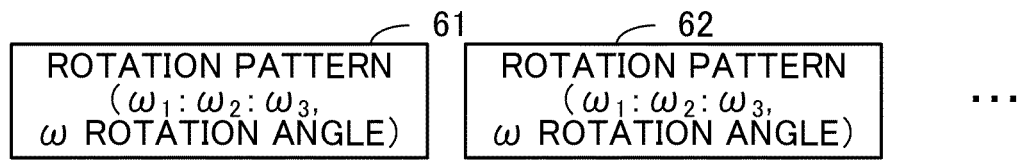

FIG. 27 depicts one example of a rotation pattern generation method. The computational grid data generation unit 160 generates a rotational axis based on the landmarks added to the heart shape data 141. As one example, the computational grid data generation unit 160 defines a three-dimensional local coordinate system (that is, orthogonal coordinates) that has the position of the landmark 42 that is the cardiac apex as the origin. The axes of the local coordinate system are decided using the positions of the landmarks 41 to 43. Note that the heart model 33 appearing in FIG. 27 is depicted with the left ventricle facing forward.

As one example, the computational grid data generation unit 160 sets a vector that points in the direction from the landmark 42 that is the cardiac apex toward the landmark 43 indicating the position of the mitral valve center as a vector m. Out of the plurality of landmarks 41, the computational grid data generation unit 160 sets a vector that points from a landmark placed on the posterior interventricular sulcus in the direction of a landmark placed on the anterior interventricular sulcus as a vector s. The vector s is a vector pointing in a direction from, the posterior interventricular sulcus toward the anterior interventricular sulcus.

Let vectors with local orthogonal basis and a length of 1 be vectors "$v_1$", "$v_2$", and $v_3$". Vector $v_1$ has the same orientation as "(mxs)xm". Vector $v_2$ has the same orientation as "mxs". Vector $v_2$ is a vector oriented in a direction from the septum toward the left ventricular free wall. Vector $v_3$ has the same orientation as "m". Vector $v_3$ is a vector oriented from the bottom to the top of the cardiac axis (that is, in a direction from, the cardiac apex toward the mitral valve center). Each of the vectors $v_1$, $v_2$, and $v_3$ rotates due to spin around the other vectors.

Let $\omega_1$ be the rotational speed around an axis in the direction of vector $v_1$. Let $\omega_2$ be the rotational speed around an axis in the direction of vector $v_9$. Let $\omega_3$ be the rotational speed around an axis in the direction of vector $v_3$. When it is assumed that "$\omega=\omega_1 v_1+\omega_2 v_2 \omega_3 v_3$", is an axial vector which may be integrated in a time-invariant manner, the rotation tensor R is expressed by the following equation.

$$R = I + \frac{\sin\theta}{\theta}W + \frac{1}{2}\left(\frac{\sin\theta/2}{\theta/2}\right)^2 W^2 \quad (1)$$

$\theta$ is expressed by the following equation, where t is the spin time.

$$\theta=|\omega|t=(\omega_1^2+\omega_2^2+\omega_3^2)^{1/2}t \quad (2)$$

W is expressed by the following equation.

$$W = \begin{pmatrix} 0 & -\omega_3 & \omega_2 \\ \omega_3 & 0 & -\omega_1 \\ -\omega_2 & \omega_1 & 0 \end{pmatrix} \quad (3)$$

In this local coordinate system, the computational grid data generation unit 160 generates 25 patterns of the axial vector co, for example. The computational grid data generation unit 160 then generates sets of 5 patterns around each axial vector, making a total of 125 rotation patterns 61, 62, . . . . The direction of the axial vector $\omega$ is represented by the ratio between $\omega_1$, $\omega_2$ and $\omega_2$ ($\omega_1:\omega_2:\omega_3$). The rotation patterns 61, 62, . . . each indicate the direction of an axial vector (the ratio of $\omega_1$, $\omega_2$, and $\omega_3$) and the rotational angle in that direction.

By defining the rotation patterns 61, 62, . . . using the axial vector co in this way, it is possible to eliminate the generation of a large number of redundant rotation patterns 61, 62, . . . . That is, when the rotation patterns 61, 62, . . . are defined by rotational angles around the vectors $v_1$, $v_2$, and $v_3$ that are vectors with a local orthogonal basis, even when the rotational angles around the vectors $v_1$, $v_2$, and $v_3$ are the same, a different order of rotation will result in a different orientation of the heart model 33 after the rotation operation. For this reason, the order of rotation around the respective vectors $v_1$, $v_2$, and $v_3$ is also defined for the rotation patterns 61, 62, . . . . Here, even when the defined contents of the rotation patterns 61, 62, . . . differ, the orientation of the final heart model 33 may match. As a result, there will be a plurality of rotation patterns that define a specific orientation of the heart model 33, meaning that redundant rotation patterns are generated. When redundant rotation patterns are generated, there would be an increase in the processing of steps S154 to S156 depicted in FIG. 26 corresponding to the redundant rotation patterns.

On the other hand, by defining the rotation patterns 61, 62, . . . using the axial vector $\omega$, generation of a plurality of rotation patterns where the orientation of the heart model 33 after the rotation operation is the same is suppressed. That is, when the defined content (that is, the direction of an axial vector and the angle of rotation around this axial vector) of the rotation patterns 61, 62, . . . differ, it is guaranteed that the orientation of the heart model 33 after the rotation operation will differ. By doing so, the generation of redundant rotation patterns is suppressed. As a result, the calculation load of the processing of steps S154 to S156 is reduced, which makes the processing more efficient.

After the rotation patterns 61, 62, . . . have been generated, the computational grid data generation unit 160 rotates the heart model 33 in the local coordinate system in keeping with the respective rotation patterns 61, 62, . . . . The computational grid data generation unit 160 also generates myocardium boundary information for evaluation purposes from the X-ray images 51 and 58 indicated in the X-ray image data 123.

FIG. 28 depicts an example of a myocardium boundary information generation process. As one example, the computational grid data generation unit 160 displays the X-ray images 51 and 58 on the monitor 21. The computational grid data generation unit 160 receives an input from the user designating the outer edges of the heart 51a and 58a in the X-ray images 51 and 58. The computational grid data generation unit 160 outputs closed curves 70a and 70b indicating the designated outer edge as myocardium boundary information 70. The computational grid data generation unit 160 evaluates the rotation patterns 61, 62, . . . using the generated myocardium boundary information 70.

Figure 29:
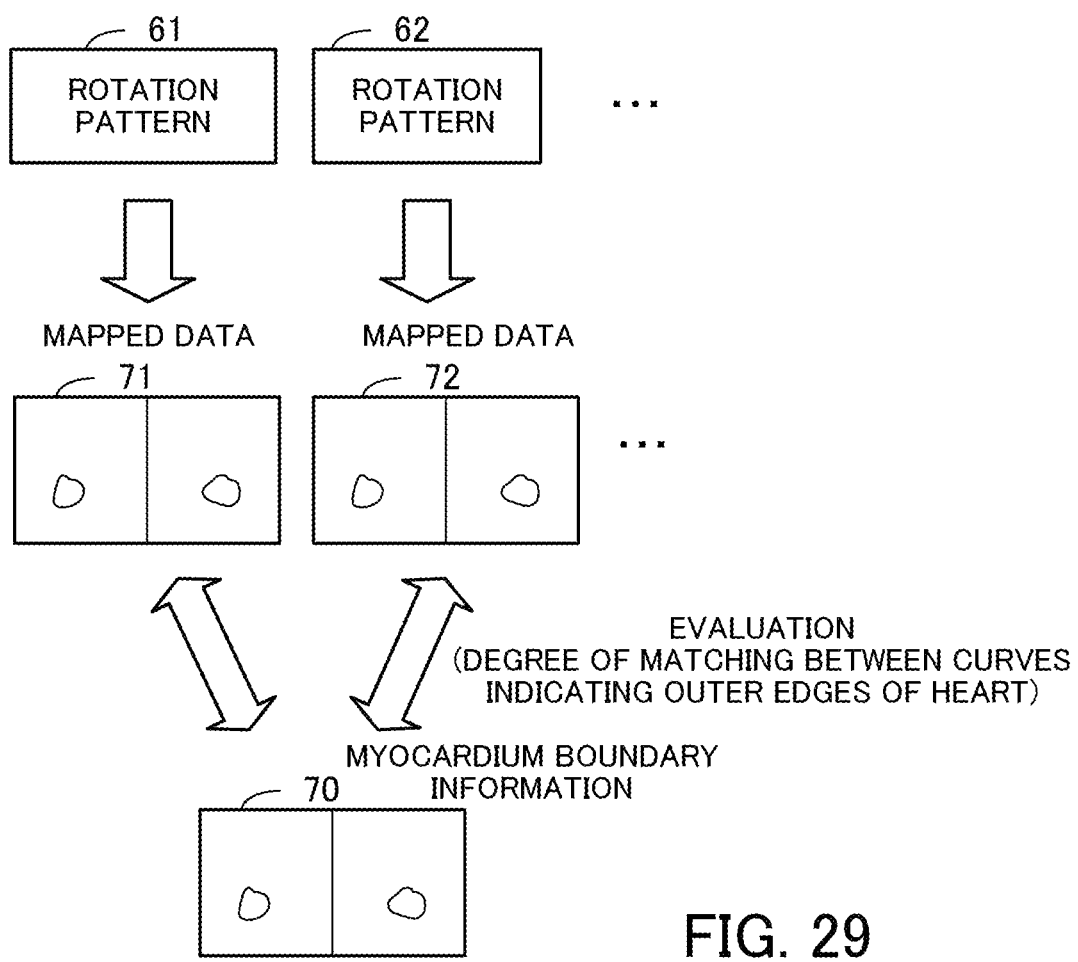
FIG. 29 depicts an example of a rotation pattern evaluation method.

FIG. 29 depicts an example of an evaluation method for rotation patterns. As one example, the computational grid data generation unit 160 generates mapped data 71, 72, . . . in which the heart model 33 that has been rotated by the rotation patterns 61, 62, . . . has been projected in the front direction and the side direction. The computational grid data generation unit 160 then evaluates the accuracy of the rotation pattern by comparing the mapped data 71, 72, . . . of the rotation patterns and the myocardium boundary information 70.

As one example, the computational grid data generation unit 160 superimposes a closed curve indicating the outer edge of the map of the projected image of the heart indicated by the mapped data 71 on the closed curve indicated by the myocardium boundary information 70. The computational grid data generation unit 160 sets the degree of overlap with the closed curve as an evaluation value. As one example, the computational grid data generation unit 160 uses the number of pixels in the part where the closed curve is overlapped as the evaluation value. The computational grid data generation unit 160 calculates an evaluation value for each rotation pattern and selects the rotation pattern with the highest evaluation value.

Figure 30:
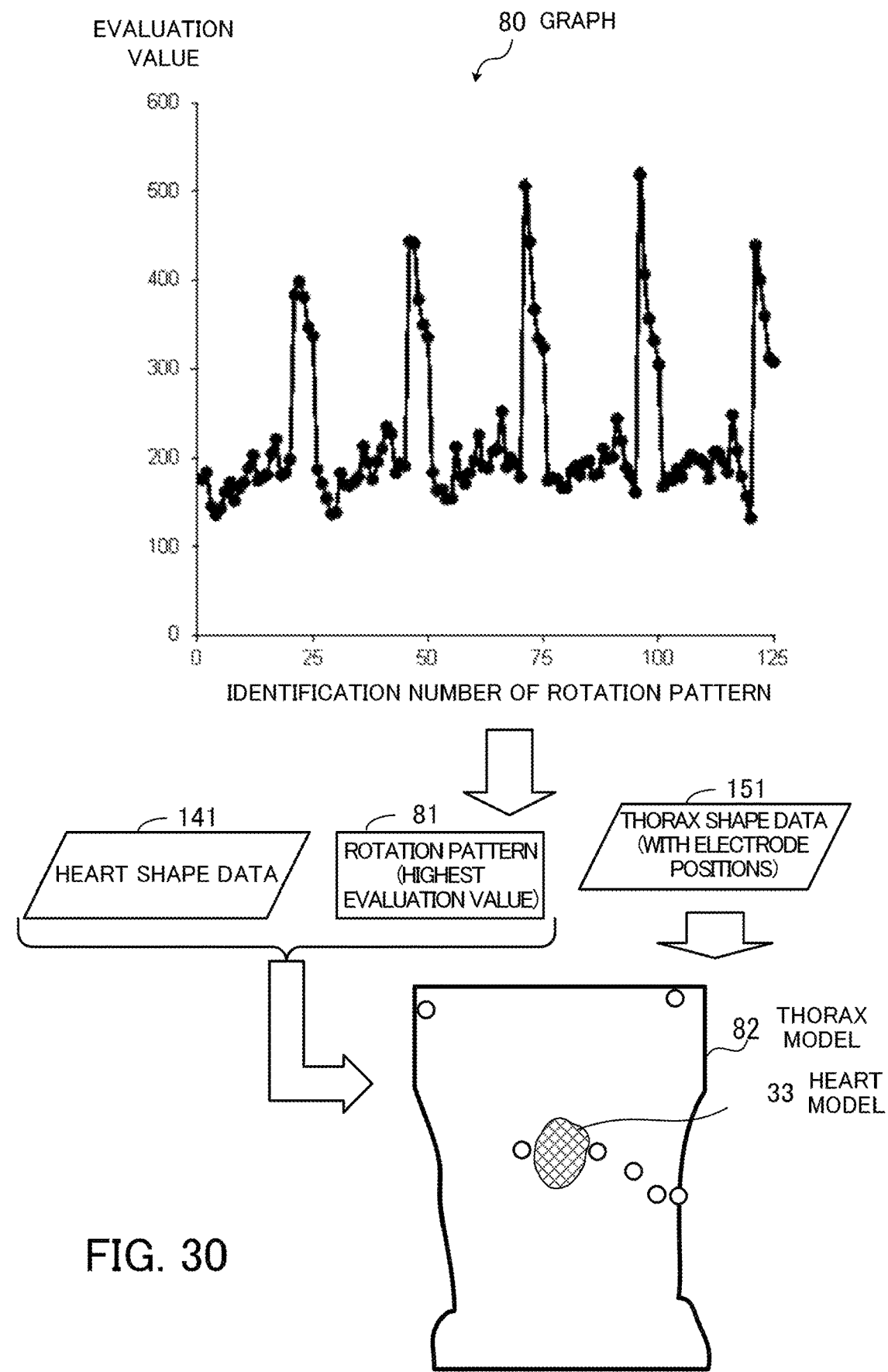
FIG. 30 depicts one example of rotation pattern selection.

FIG. 30 depicts one example of rotation pattern selection. A graph 80 indicates the evaluation value of each rotation pattern. The horizontal axis of the graph 80 represents the identification numbers of the 125 rotation patterns. The vertical axis of the graph 80 represents the evaluation values.

The computational grid data generation unit 160 selects a rotation pattern 81 with the highest evaluation value. The computational grid data generation unit 160 rotates the heart model 33 indicated by the heart shape data 141 according to the selected rotation pattern 81. The computational grid data generation unit 160 then places the heart model 33 inside a thorax model 82 indicated by the thorax shape data 151.

In this way, the heart shape is placed at an appropriate position within the thorax shape.

Computational Grid Data Generation and Effects

When the heart shape has been placed inside the thorax shape, the computational grid data generation unit 160 generates the computational grid data 161 based on the thorax model 82 and the heart model 33 placed inside the thorax model 82. As one example, the thorax model 82 and the heart model 33, which are surface models, are converted into solid models composed of a plurality of three-dimensional elements (solids). The computational grid data generation unit 160 then outputs data expressing the solid model as the computational grid data 161.

By inputting the computational grid data 161 generated in this way into the biological simulation unit 170, the operation of the patient's heart is reproduced by the biological simulation unit 170 and accurate electrocardiogram data 171 is obtained. As one example, the biological simulation unit 170 is able to output the electrocardiogram data 171 of the patient for a case where a CRT apparatus has been implanted. In this case, a doctor may refer to the outputted electrocardiogram data 171 to confirm in advance any effect in improving the patient's condition achieved when a CRT apparatus is implanted in the patient.

In addition, heart shape data indicating the natural ventricle shape of the patient is generated based on the echo image data 121. The echo image data 121 may be obtained using an ultrasonic diagnostic apparatus. Ultrasonic diagnosis of a patient using an ultrasonic diagnostic apparatus places a lower physical burden on the patient than a CT or an MRI.

In addition, the simulation apparatus 100 correctly reflects the features in the heart shape of the patient in the heart shape data 141 based on the information in the echo examination report 122. As a result, the accuracy of the heart shape data is improved, which makes it possible to perform an accurate biological simulation.

The heart model 33 indicated by the heart shape data 141 is volume data divided into four parts, which are the left ventricular muscle, the left ventricular blood pool, the right ventricular muscle, and the right ventricle blood pool. In addition, in the heart model 33, the aortic valve, the mitral valve, the tricuspid valve, and the pulmonary valve, which serve as the four valves for blood inflows and outflows, are disposed at appropriate positions. By doing so, it is possible to perform highly accurate numerical analysis of the operation of the heart in a biological simulation.

The thorax shape is automatically generated based on the X-ray image data 123 using a function for a polar coordinate system. This means that the burden placed on the user by this task is reduced.

To place the heart shape inside the thorax shape, a plurality of rotation patterns in which the heart shape is rotated at various angles about three axes of rotation are generated, and the orientation of the heart shape in the rotation pattern that is most accurate in comparison with X-ray images is decided. By doing so, the heart shape is placed inside the thorax shape with high accuracy, which means the accuracy of a biological simulation is improved.

When the electrodes for electrocardiogram measurement are placed on the thorax model 82, since it is possible to perform positioning with reference to X-ray images that have been placed in a three-dimensional space, it is possible to accurately set the positions of the electrodes in the three-dimensional space.

Figure 31:
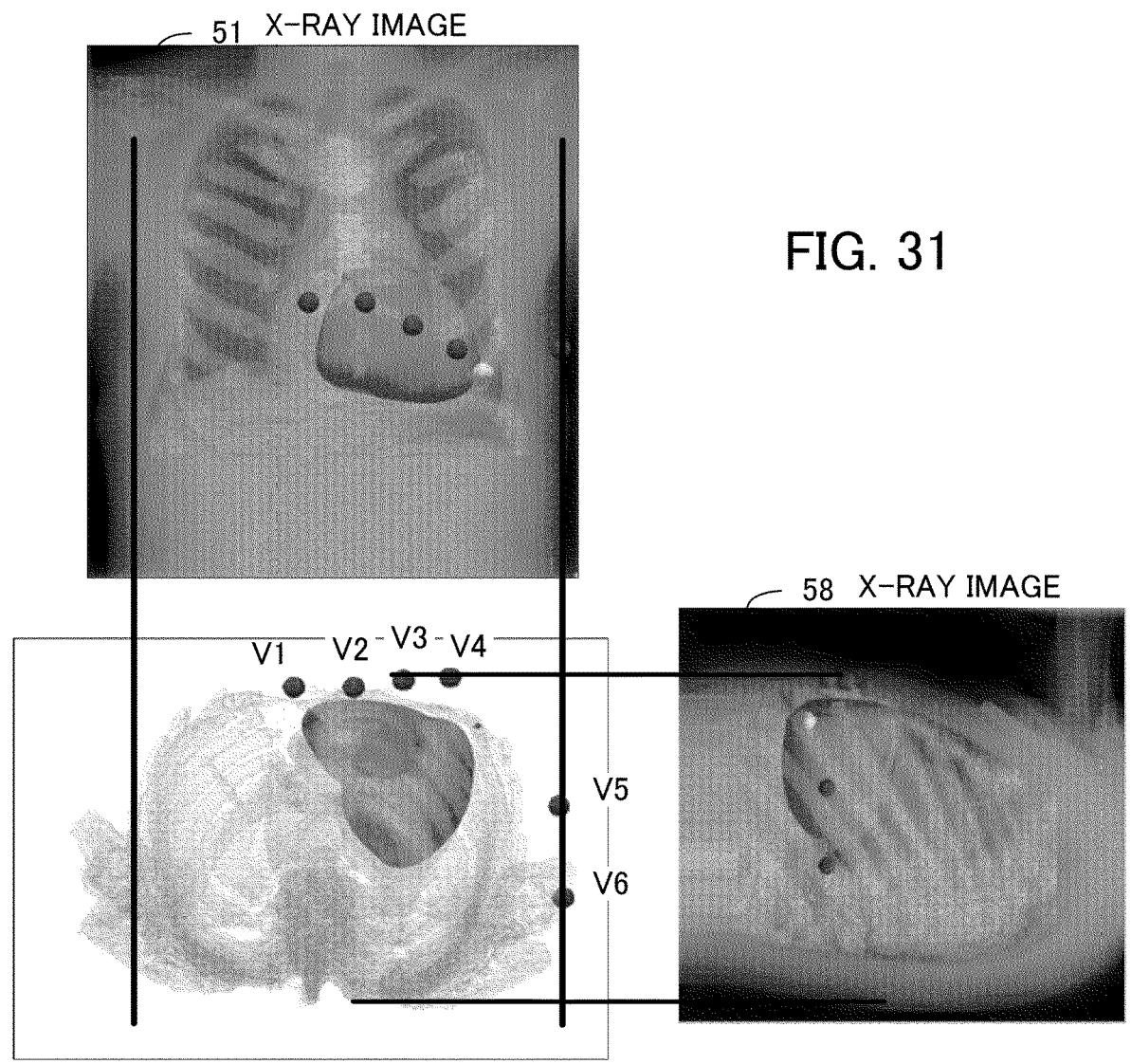
FIG. 31 depicts one example of electrode placement.

FIG. 31 depicts one example of electrode placement. In a 12-lead electrocardiogram, six electrodes V1 to V6 are placed on the chest. When doing so, the electrode V1 is placed on the right edge of the sternum in the fourth intercostal space. V2 is placed on the left edge of the sternum in the fourth intercostal space. The locations where these electrodes V1 and V2 are placed are depressions in the chest, and it is difficult to precisely designate these positions in a three-dimensional space using merely the X-ray images 51 and 58. In the simulation apparatus 100, when the positions of the electrodes V1 and V2 are designated with reference to the X-ray image 51 from the front, the positions in the anteroposterior direction are correctly set based on the thorax model 82. By correctly setting the electrode positions, the accuracy of the electrocardiogram data 171 obtained in a biological simulation is improved.

Other Embodiments

Although the electrocardiogram data 171 is outputted by a biological simulation in the second embodiment, various other data may be outputted by a biological simulation. Since computational grid data including the thorax and the heart are generated with high accuracy, data aside from the electrocardiogram data 171 may also be calculated with high accuracy.

Although it is assumed in the second embodiment that a biological simulation is executed to check the effect of treatment on a patient, the results of the biological simulation may be used for various other purposes. As one example, the results of a biological simulation may be used for AI (Artificial Intelligence) or data analysis.

Although the simulation apparatus 100 generates the computational grid data 161 and performs a biological simulation based on the computational grid data 161 in the second embodiment, the generation of the computational grid data 161 and the biological simulation may be performed by different apparatuses. As one example, a user's computer may perform the processing up to the generation of the computational grid data 161, and an external high performance computing (HPC) system called a "supercomputer" may execute the biological simulation.

Although the echo image is a three-dimensional echo image in the second embodiment, it is also possible to use two-dimensional (2D) echo images instead of a three-dimensional echo image. In this case, the heart shape data generation unit 140 aligns the positions of cross sections of the heart appearing in a plurality of two-dimensional echo images with cross sections of the heart at different positions in a three-dimensional space. As one example, the heart shape data generation unit 140 is able to align cross-sections of the heart appearing in a plurality of two-dimensional echo images in a three-dimensional space based on operations by the user.

Although several embodiments have been described above in exemplary form, the configurations of the respective elements in the embodiments may be replaced with other configurations with the same functions. Other components or processes may be freely added. In addition, any two or more configurations (features) of the embodiments described above may be combined.

According to one aspect, it is possible to generate a three-dimensional shape that reproduces the thorax and the heart inside the thorax based on an echo image and an X-ray image.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable recording medium storing therein a computer program that causes a computer to execute a process comprising:
    generating heart shape data indicating a three-dimensional shape including an internal structure of a heart of a subject based on echo image data indicating a cross-sectional image of the heart;
    generating thorax shape data indicating a three-dimensional shape of a thorax of the subject based on X-ray image data indicating an X-ray image of the thorax of the subject; and
    deciding a position of a characteristic part in the three-dimensional shape of the heart indicated by the heart shape data within the three-dimensional shape of the thorax indicated by the thorax shape data based on a position of the characteristic part of the heart inside the thorax in the X-ray image;
    generating a plurality of rotation patterns in which a ratio of rotational angles around each of a plurality of rotational axes that pass through the characteristic part in the three-dimensional shape of the heart and a rotational angle around an axial vector whose direction of rotation is specified by the ratio are designated;
    rotating the three-dimensional shape of the heart according to each of the plurality of rotation patterns; and
    deciding the orientation of the three-dimensional shape of the heart within the three-dimensional shape of the thorax based on the result of comparing an image obtained by projecting the three-dimensional shape of the heart after the rotating and the image of the heart appearing in the X-ray image.

2. The non-transitory computer-readable recording medium according to claim 1, wherein the generating of the thorax shape data includes extracting an outer edge of the thorax based on the X-ray image and generating the three-dimensional shape of the thorax based on the outer edge that has been extracted and an average thorax shape that has been statistically obtained.

3. The non-transitory computer-readable recording medium according to claim 2, wherein the generating of the thorax shape data includes:
    generating a similar thorax shape by enlarging or reducing the average thorax shape based on the outer edge of the thorax; and
    correcting a ratio between a horizontal width and a vertical width of the similar thorax shape based on a ratio between a horizontal width of the thorax indicated in a first X-ray image taken from a front and a vertical width of the thorax indicated in a second X-ray image taken from a side.

4. The non-transitory computer-readable recording medium according to claim 3, wherein the generating of the thorax shape data includes:
    specifying a center line of the thorax when viewed from the side based on the second X-ray image; and
    deciding a position in a three-dimensional space of a corrected thorax shape that has been obtained by the correcting of the ratio between the horizontal width and the vertical width of the similar thorax shape based on the center line.

5. The non-transitory computer-readable recording medium according to claim 1, wherein the process further includes:
    placing the X-ray image inside the three-dimensional space in which the three-dimensional shape of the thorax is indicated; and
    converting placed positions of electrodes for electrocardiogram measurement that have been designated on the X-ray image into positions on a surface of the three-dimensional shape of the thorax.

6. The non-transitory computer-readable recording medium according to claim 1, wherein
    the generating of the heart shape data includes generating the heart shape data that represents the three-dimensional shape of the heart with a first surface model,
    the generating of the thorax shape data includes generating the thorax shape data that represents the three-dimensional shape of the thorax with a second surface model, and
    the process further includes placing, upon deciding the position and the orientation of the three-dimensional shape of the heart, the first surface model inside the second surface model with the position and the orientation that have been decided and generating, based on the first surface model and the second surface model, computational grid data that represent the three-dimensional shape of the thorax incorporating the heart with a solid model.

7. A three-dimensional shape data generation method comprising:
    generating, by a processor, heart shape data indicating a three-dimensional shape including an internal structure of a heart of a subject based on echo image data indicating a cross-sectional image of the heart;
    generating, by the processor, thorax shape data indicating a three-dimensional shape of a thorax of the subject based on X-ray image data indicating an X-ray image of the thorax of the subject; and
    deciding a position of a characteristic part in the three-dimensional shape of the heart indicated by the heart shape data within the three-dimensional shape of the thorax indicated by the thorax shape data based on a position of the characteristic part of the heart inside the thorax in the X-ray image;
    generating a plurality of rotation patterns in which a ratio of rotational angles around each of a plurality of rotational axes that pass through the characteristic part in the three-dimensional shape of the heart and a rotational angle around an axial vector whose direction of rotation is specified by the ratio are designated;
    rotating the three-dimensional shape of the heart according to each of the plurality of rotation patterns; and
    deciding the orientation of the three-dimensional shape of the heart within the three-dimensional shape of the thorax based on the result of comparing an image obtained by projecting the three-dimensional shape of the heart after the rotating and the image of the heart appearing in the X-ray image.

8. An information processing apparatus comprising:
    a memory; and
    a processor coupled to the memory and the processor configured to:
    generate heart shape data indicating a three-dimensional shape including an internal structure of a heart of a subject based on echo image data indicating a cross-sectional image of the heart;

generate thorax shape data indicating a three-dimensional shape of a thorax of the subject based on X-ray image data indicating an X-ray image of the thorax of the subject; and decide a position of a characteristic part in the three-dimensional shape of the heart indicated by the heart shape data within the three-dimensional shape of the thorax indicated by the thorax shape data based on a position of the characteristic part of the heart inside the thorax in the X-ray image;

generate a plurality of rotation patterns in which a ratio of rotational angles around each of a plurality of rotational axes that pass through the characteristic part in the three-dimensional shape of the heart and a rotational angle around an axial vector whose direction of rotation is specified by the ratio are designated;

rotate the three-dimensional shape of the heart according to each of the plurality of rotation patterns; and decide the orientation of the three-dimensional shape of the heart within the three-dimensional shape of the thorax based on the result of comparing an image obtained by projecting the three-dimensional shape of the heart after the rotating and the image of the heart appearing in the X-ray image.

\* \* \* \* \*